United States Patent
Hofmann et al.

(10) Patent No.: US 12,413,962 B2
(45) Date of Patent: Sep. 9, 2025

(54) DYNAMIC LENGTH SECURITY IN THE PHYSICAL LAYER

(71) Applicant: Apple Inc., Cupertino, CA (US)

(72) Inventors: Christian Hofmann, Munich (DE); Sameh M. Eldessoki, Munich (DE); Tarik Tabet, Carlsbad, CA (US); Panagiotis Botsinis, Munich (DE); Amr Abdelrahman Yousef Abdelrahman Mostafa, Munich (DE)

(73) Assignee: Apple Inc., Cupertino, CA (US)

(*) Notice: Subject to any disclaimer, the term of this patent is extended or adjusted under 35 U.S.C. 154(b) by 91 days.

(21) Appl. No.: 18/239,891

(22) Filed: Aug. 30, 2023

(65) Prior Publication Data
US 2024/0080661 A1  Mar. 7, 2024

(30) Foreign Application Priority Data
Sep. 2, 2022  (GR) .............................. 20220100723

(51) Int. Cl.
*H04L 29/06* (2006.01)
*H04L 9/06* (2006.01)
*H04L 9/40* (2022.01)
*H04W 12/033* (2021.01)

(52) U.S. Cl.
CPC ......... *H04W 12/033* (2021.01); *H04L 9/0637* (2013.01); *H04L 63/0485* (2013.01)

(58) Field of Classification Search
None
See application file for complete search history.

(56) References Cited

U.S. PATENT DOCUMENTS

2010/0232356 A1* 9/2010 Maheshwari ......... H04L 1/1896
370/328

FOREIGN PATENT DOCUMENTS

CA         3156809 A1 *  4/2021  ....... H04L 27/26025

* cited by examiner

*Primary Examiner* — Andrew J Steinle
(74) *Attorney, Agent, or Firm* — Fish & Richardson P.C.

(57) ABSTRACT

Methods, apparatuses, systems, and computer programs for ciphering information in a physical layer of a wireless communications network are disclosed. In one aspect, a method can include obtaining, by a UE, a transport block for transmission using the physical layer, determining, by the UE, whether the size of the transport block satisfies a predetermined threshold, and based on a determination, by the UE, that the size of the transport block satisfies a predetermined threshold size: ciphering, by the UE, the entire transport block, and transmitting, by the UE and to an access node, the ciphered transport block using the physical layer.

17 Claims, 16 Drawing Sheets

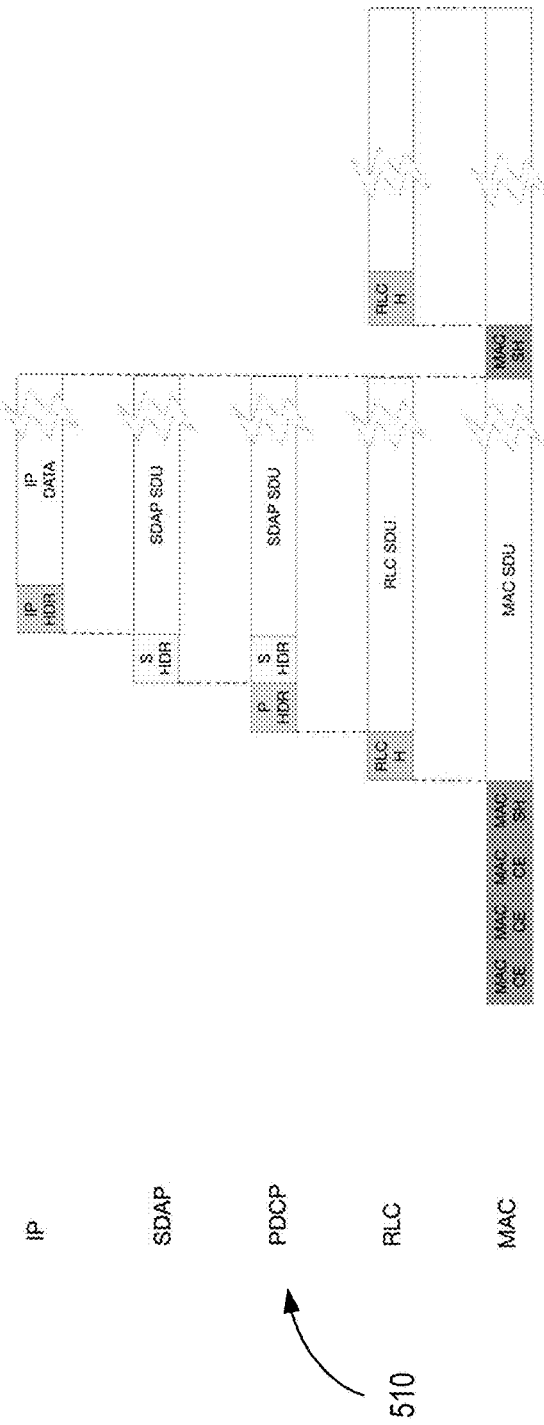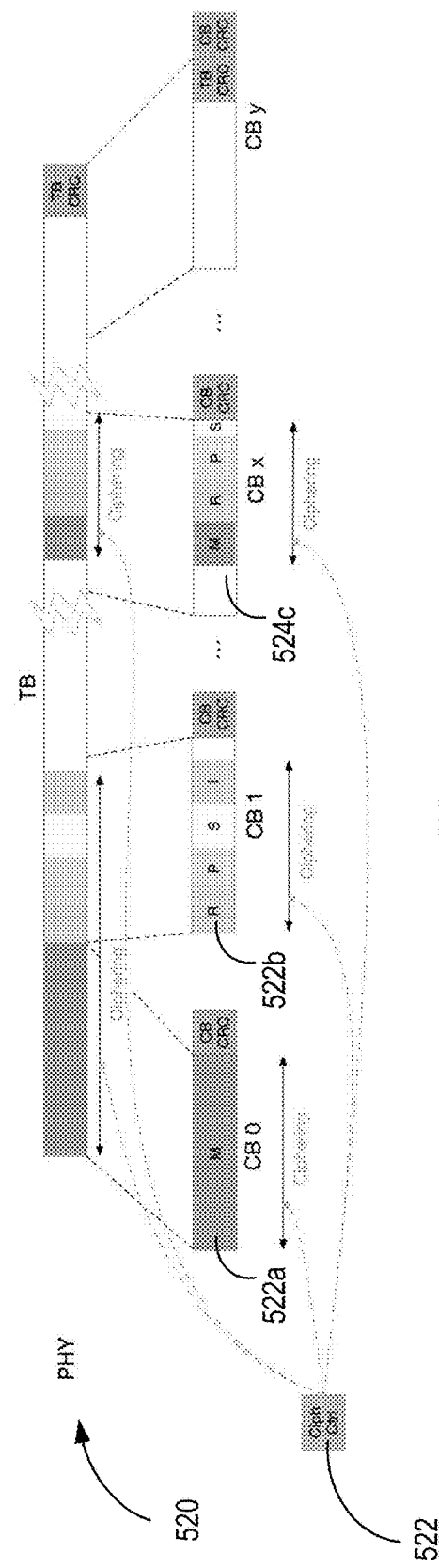
FIG. 5

SN information (e.g. 16bit)

Pattern Information
(Byte exact, most overhead)

Pattern Information
(Blocks IDs carry implicit cipher length info, less overhead)

Pattern Information
(variable, repeating Pattern IDs which defines Block Length + Interval, less overhead)

Pattern Information
(repetitive Pattern ID for whole TB, least overhead)

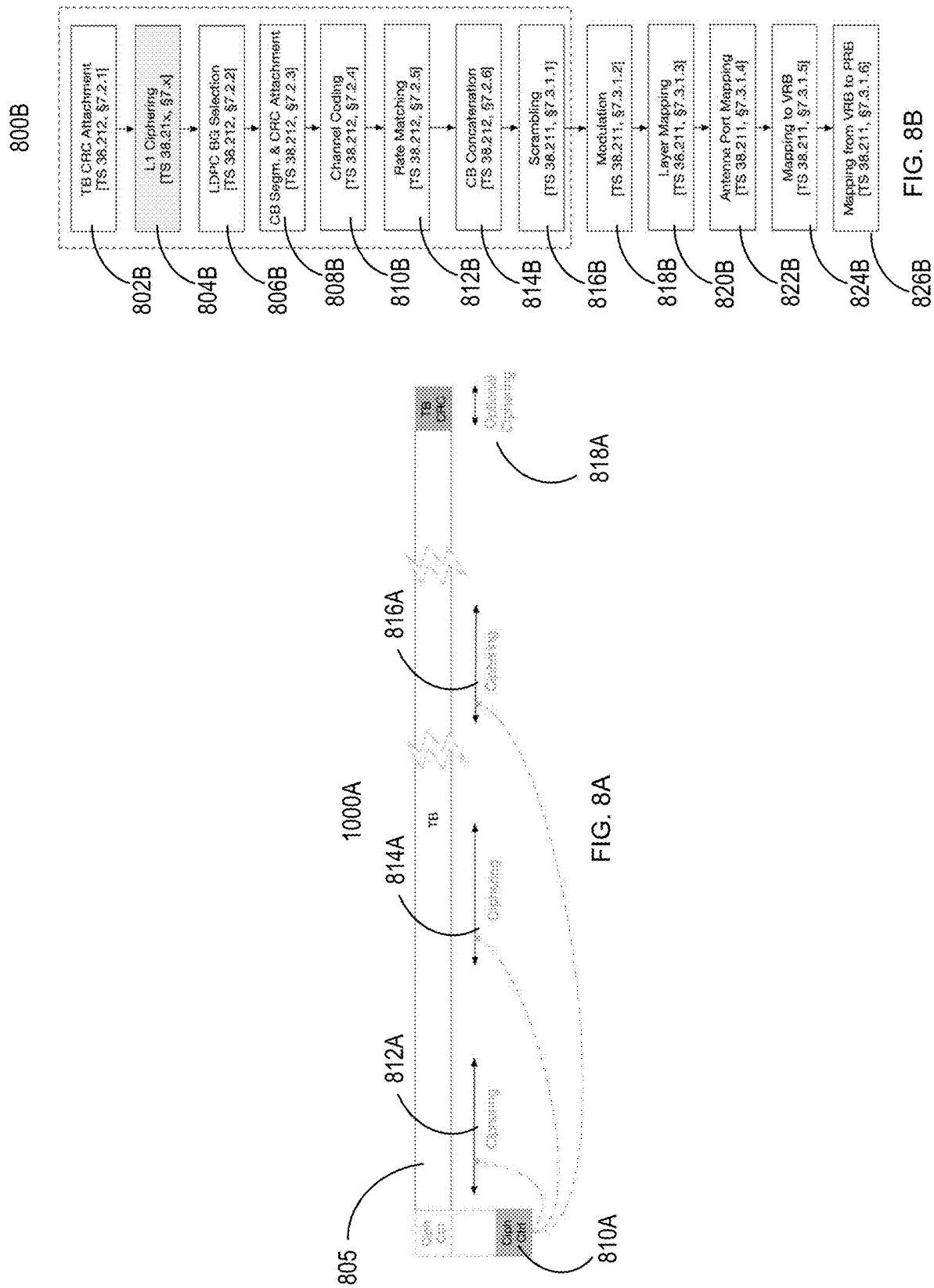

DYNAMIC LENGTH SECURITY IN THE PHYSICAL LAYER

CROSS-REFERENCE TO RELATED APPLICATIONS

This application claims priority to Greek Patent Application No. 20220100723, filed on Sep. 2, 2022, the entire contents of which are hereby incorporated by reference.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

SUMMARY

The present disclosure relates to ciphering of transport blocks (TBs), or a portion thereof, during physical layer processing of a TB. In some instances, most of the data used to fill a TB may already be ciphered. Such data may include IP payload data. However, the remaining data such as L2 headers, IP headers, or both, will not be ciphered. Such unciphered data can create an opening for attackers. Accordingly, the present disclosure provides a solution to this problem that is able to cipher the small amount of unciphered data in a TB in order to secure such data during processing in the physical layer.

Because some of the data used to fill the TB may already be ciphered, the present disclosure seeks a balance between ciphering an entire TB, which may necessarily result in ciphering of at least some ciphered data and partially ciphering a TB, which can be more complex. The balance achieved by the present disclosure is to evaluate the size of a TB and only cipher the entire TB if the size of the TB is below a predetermined threshold. Alternatively, if the TB is above certain threshold size, the present disclosure then performs partial ciphering in order to target portions of a TB that include unsecured (e.g., unciphered) data such as L2 headers, IP headers, or both, and not cipher portions of the TB that are already ciphered such as the IP data payload. The present disclosure provides novel ciphering control information that can be transmitted to a recipient device that is to receive the TB and the recipient device can use the ciphering control information to decipher the TB.

In accordance with one aspect of the present disclosure, a method for ciphering information in a physical layer of a wireless communications network is disclosed. In one aspect, the method can include obtaining, by a UE, a transport block for transmission using the physical layer, determining, by the UE, whether the size of the transport block satisfies a predetermined threshold, and based on a determination, by the UE, that the size of the transport block satisfies a predetermined threshold size: ciphering, by the UE, the entire transport block, and transmitting, by the UE and to an access node, the ciphered transport block using the physical layer.

Other aspects includes apparatuses, systems, and computer programs for performing the actions of the aforementioned method.

In accordance with another aspect of the present disclosure, a method for ciphering information in a physical layer of a wireless communications network is disclosed. In one aspect, the method can include obtaining, by an access node, a transport block for transmission using the physical layer, determining, by the access node, whether the size of the transport block satisfies a predetermined threshold, and based on a determination, by the access node, that the size of the transport block satisfies a predetermined threshold size: ciphering, by the access node, the entire transport block, and transmitting, by the access node and to a UE, the ciphered transport block using the physical layer.

Other aspects includes apparatuses, systems, and computer programs for performing the actions of the aforementioned method.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF THE FIGURES

FIG. 5 illustrates an example of a visual representation of ciphering of a portion of a transport block, according to some implementations.

FIG. 8A is an example of a visual representation of partial ciphering of a transport block, according to some implementations.

FIG. 8B is a flowchart of an example of a process for multiplexing transport blocks, according to some implementations.

DETAILED DESCRIPTION

In general, between the fact that IP data payloads are typically ciphered and the use of integrity protected E2E by many applications, often times approximately 99% of a transport block (TB) may already be ciphered—assuming, for example, 1500 Byte SDAP SDU. Nonetheless, 3 GPP Ciphering/Integrity in PDCP only protects the air interface (UE<->gNB). With increasing throughput, more and more hardware is required for baseband (BB) modem design to scale accordingly with the increased throughput, even though peak throughput is rare.

In addition, though the portion of the TB that is unciphered may be a relatively small portion of the TB, problems can arise due to the lack of protection for this remaining portion of the TB. For example, eavesdroppers can see metadata such as these L2 headers and use them to discover traffic patterns, use of applications, use of services, or a combination thereof. Alternatively, or in addition, an attacker can insert forged MAC CEs, RLC Headers to break the connection to cause, for example, SCell deactivation or SN window stalling.

Accordingly, even though peak throughput (Tput) is rare, a modem (also referred as modem chip or baseband modem) carries a lot of HW to cipher/integrity protect each byte when provisioned for the max throughput (Tput) to secure data for 1 hop only (UE gNB). In addition, most traffic is already ciphered on application layer. Nonetheless, a small portion of the data of each TB such as L2 headers are still unprotected resulting in some privacy concerns.

To address these concerns and others, the present disclosure provides apparatuses, systems, methods, and computer programs for dynamic length security in the physical layer of a wireless communications network. Techniques of the present disclosure enable the remaining portions of the TB to be ciphered, thereby protecting vulnerable portions of the TB from the attacks referenced above.

Figure 1:
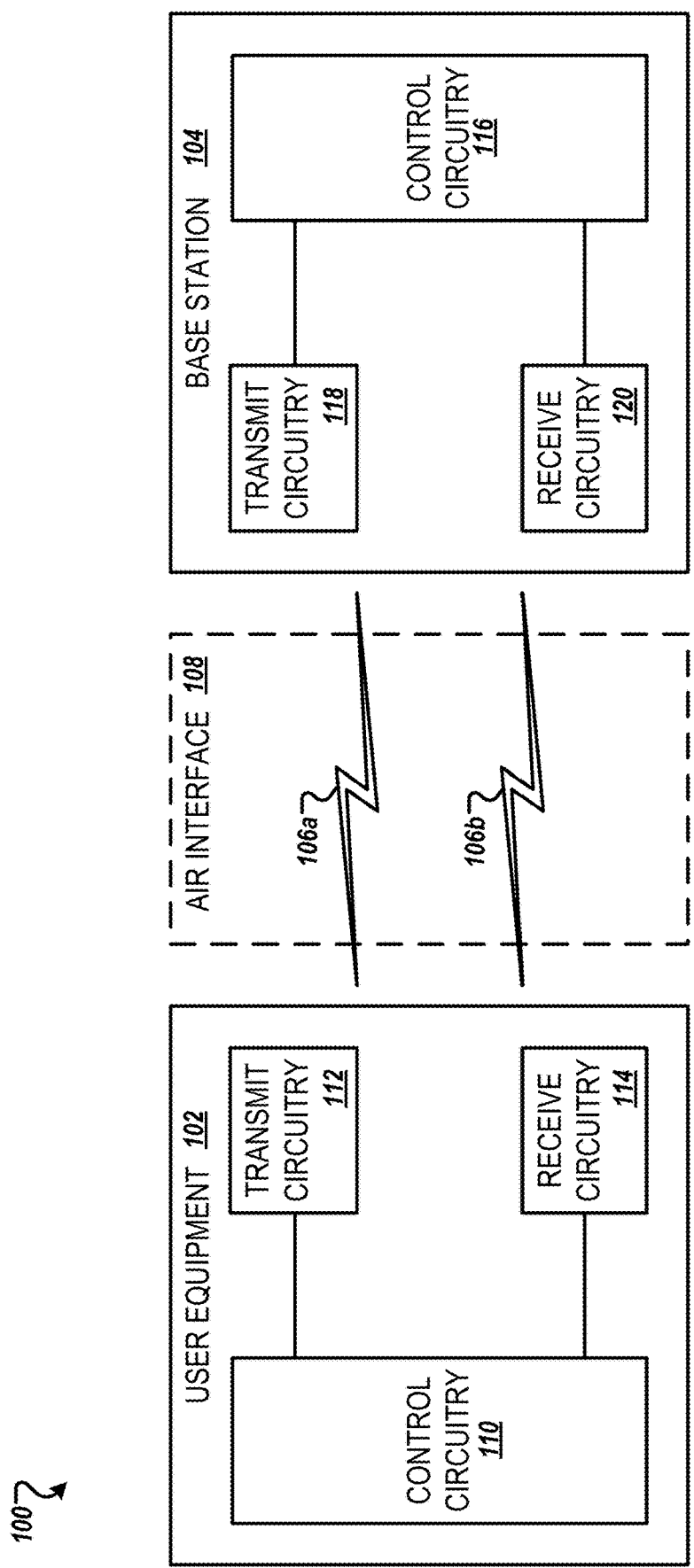
FIG. 1 illustrates a wireless network, according to some implementations.

FIG. 1 illustrates a wireless network 100, according to some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

In some implementations, the wireless network 100 may be a Non-Standalone (NSA) network that incorporates Long Term Evolution (LTE) and Fifth Generation (5G) New Radio (NR) communication standards as defined by the Third Generation Partnership Project (3GPP) technical specifications. For example, the wireless network 100 may be a E-UTRA (Evolved Universal Terrestrial Radio Access)-NR Dual Connectivity (EN-DC) network, or a NR-EUTRA Dual Connectivity (NE-DC) network. However, the wireless network 100 may also be a Standalone (SA) network that incorporates only 5G NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, machine-type devices such as smart meters or specialized devices for healthcare, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry.

In various implementations, aspects of the transmit circuitry 112, receive circuitry 114, and control circuitry 110 may be integrated in various ways to implement the operations described herein. The control circuitry 110 may be adapted or configured to perform various operations such as those described elsewhere in this disclosure related to a UE.

The transmit circuitry 112 can perform various operations described in this specification. Additionally, the transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108.

The receive circuitry 114 can perform various operations described in this specification. Additionally, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In implementations, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any UE connected to the base station 104. The transmit circuitry 118 may transmit downlink physical channels includes of a plurality of downlink subframes. The receive circuitry 120 may receive a plurality of uplink physical channels from various UEs, including the UE 102.

In FIG. 1, the one or more channels 106A, 106B are illustrated as an air interface to enable communicative coupling, and can be consistent with cellular communications protocols, such as a GSM protocol, a CDMA network protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UE 102 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Control Channel (PSCCH), a Physical Sidelink Discovery Channel (PSDCH), and a Physical Sidelink Broadcast Channel (PSBCH).

Figure 2:
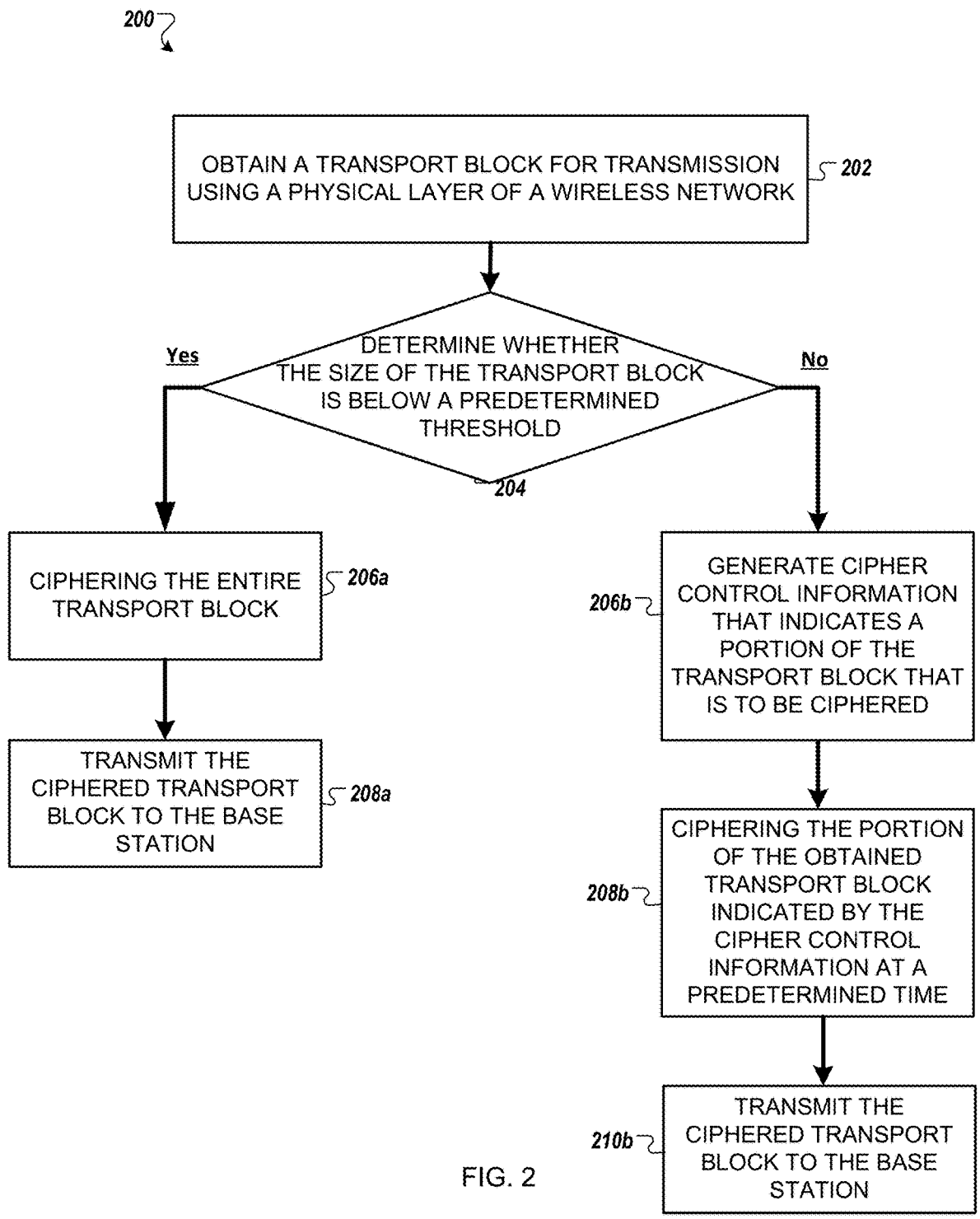
FIG. 2 illustrates a flowchart of an example of a process for dynamic length data security in the physical layer of a wireless network, according to some implementations.

FIG. 2 illustrates a flowchart of an example of a process 200 for dynamic length data security in the physical layer of a wireless network, according to some implementations. For convenience, the process 200 will be described as being performed by a device. In some implementations, the device can be user equipment (UE) such as the UE 102 of FIG. 1 or the UE 1500 of FIG. 15. In other implementations, however, the process 200 can also be performed by an access node such as the base state 104 of FIG. 1 or the access node 1600 of FIG. 16.

A device can begin execution of the process 200 by obtaining transport block for transmission using a physical layer of a wireless network (202). In some implementations, where the device is a UE performing the process 200, the physical layer can include the PRACH, PUSCH, or PUCCH. In other implementations, where an access node is a device performing the process 200, the physical layer can include the PBCH, PDSCH, or PDCCH.

The device can continue execution of the process 200 by determining whether the size of the obtained transport block is below a predetermined threshold (204). In some implementations, if the device determines at stage 204 that the size of the transport block is below the predetermined threshold, then the device can continue execution of the process 200 by ciphering the entire transport block (206a). Then, after ciphering the entire transport block at stage 206a, the device can continue execution of the process 200 by transmitting the ciphered transport block to the base station (208a).

Alternatively, if the device determines at stage 204 that the size of the transport block is greater than the predetermined threshold, the device can determine to generate ciphering control information that indicates a portion of the transport block that is to be ciphered (206b). Then, after generating the ciphering control information at stage 206b, the device can continue execution of the process 200 by ciphering the portion of the obtained transport block indicated by the ciphering control information at a predetermined time (208b), thereby creating a partially ciphered transport block. The predetermined time can be after performance of one or more stages of the process for multiplexing transport blocks set forth in TS 38.211, § 7, as described in this specification with respect to one of FIG. 8B, 9B, or 10B. After ciphering the portion of the obtained transport block indicated by the ciphering control information at stage 208B, the device can continue execution of the process 200 by transmitting the partially ciphered transport block to a base state (210b).

Figure 3:
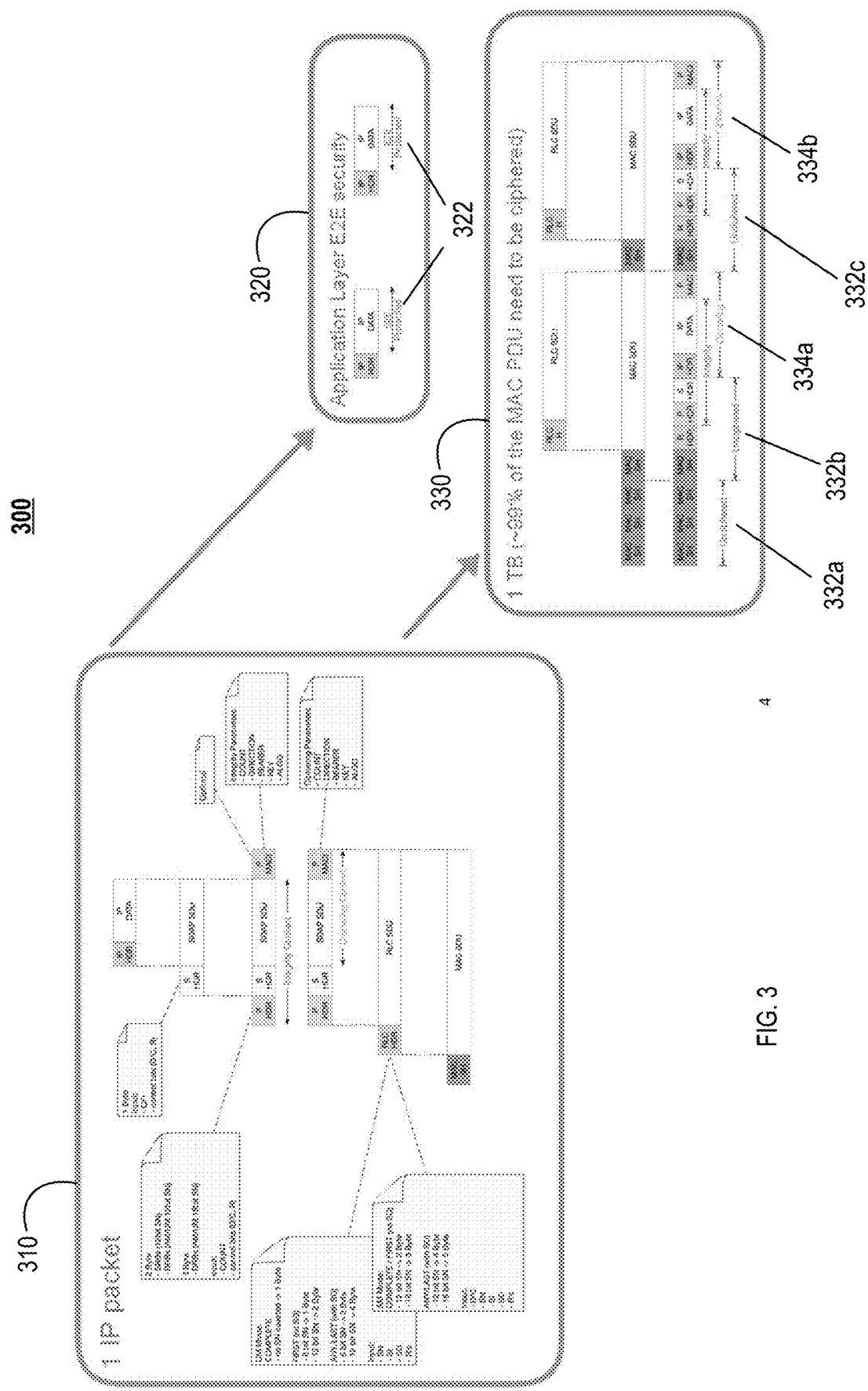
FIG. 3 illustrates an example of visual representation of fields of different data packets, according to some implementations.

FIG. 3 illustrates an example of visual representation 300 of fields of different data packets, according to some implementations. For example, FIG. 3 includes visual representation of an IP packet 310. The IP packet 310 can include an IP header 311 and IP data 312, one or more service data adaptation protocol (SDAP) headers 313, one or more packet data convergence protocol (PDCP) headers 314a, 314b, one or more radio control link headers (RLC) 316, and one or more medium access control (MAC) headers 317.

In the IP packet 310, a portion of the data is ciphered. In particular, the IP header 311 and the IP data 312 are ciphered. On the other hand, the other L2 headers such as the one or more SDAP headers 313, the PDCP headers 314a, 314b, the one or more RLC headers 316, and MAC headers 317 are unciphered and only partially integrity protected. As shown, in FIG. 3, for example, the portion of the transport block 330 spanned by 332a, 332b, 332c are unciphered, the portions of the transport block 334a, 334b are ciphered, and the portion of the transport block spanned by 336 have data integrity protections.

Given that the IP data 312 is typically ciphered and the use of integrity protected E2E as many applications, today, provide their own security, often times approximately 99% of the transport block (TB) may already be ciphered (assuming 1500 Byte SDAP SDU). For example, data packets 320 transmitted at the application layer E2E security level have IP data that is E2E protected 322. Nonetheless, 3GPP Ciphering/Integrity in PDCP only protects the air interface (UE<->gNB).

Though the portion of the TB that is unciphered may be relatively small, problems can arise due to the lack of protection for this remaining portion of the TB. For example, eavesdroppers can see metadata such as these L2 headers and use them to discover traffic patterns, use of applications, use of services, or a combination thereof. Alternatively, or in addition, an attacker can insert forged MAC CEs, RLC Headers to break the connection to cause, for example, SCell deactivation or SN window stalling.

Accordingly, even though peak throughput (Tput) is rare, a modem (also referred as modem chip or baseband modem) carries a lot of HW to cipher/integrity protect each byte, provisioned for the max throughput (Tput), for 1 hop only (UE<->gNB). In addition, most traffic is already ciphered on application layer. Nonetheless, a small portion of the data of each TB such as L2 headers are still unprotected resulting in some privacy concerns.

Figure 4:
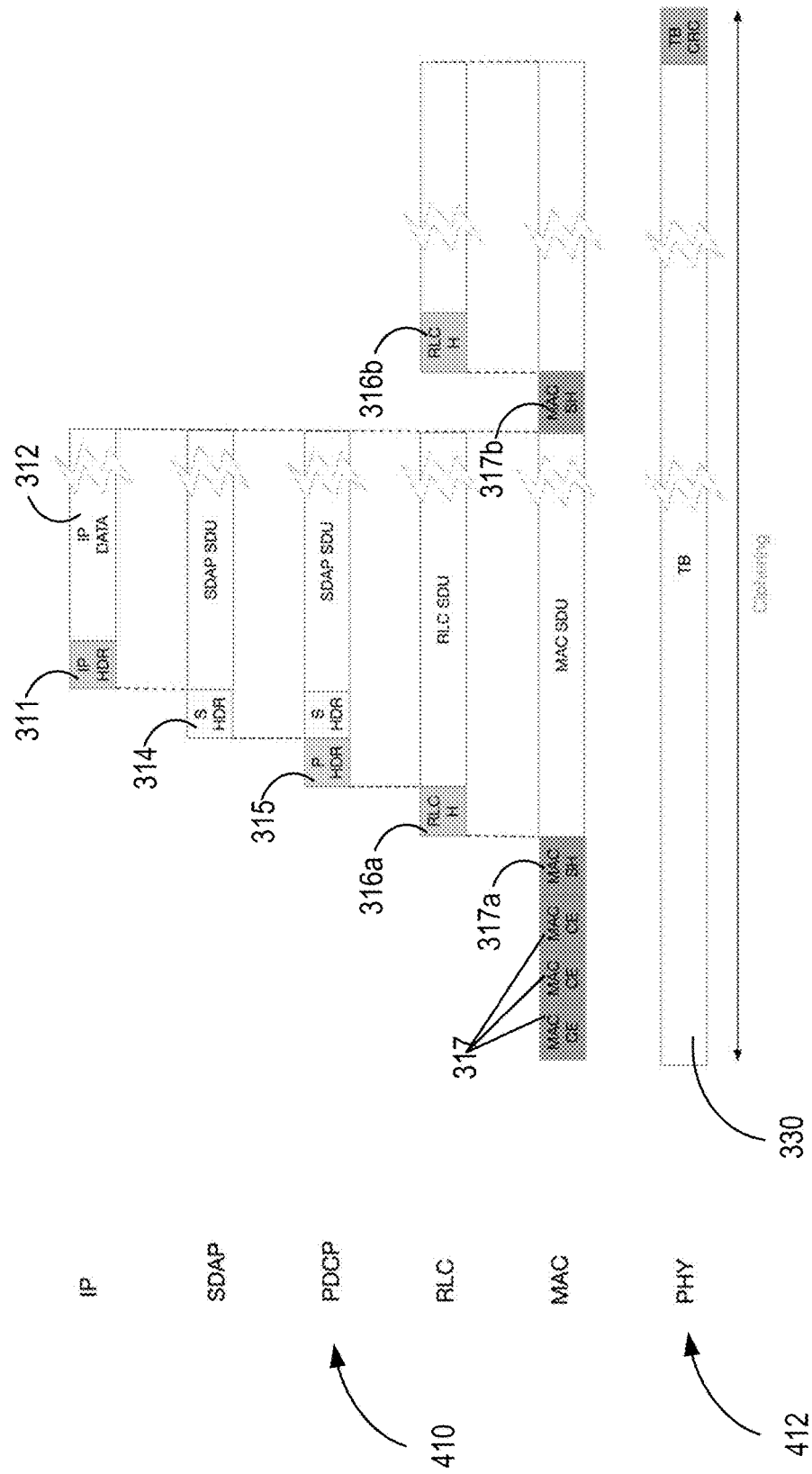
FIG. 4 illustrates an example of a visual representation of ciphering of an entire transport block, according to some implementations.

FIG. 4 illustrates an example of a visual representation 400 of ciphering of an entire transport block, according to some implementations. To address the security concerns of the unprotected portions of each TB, the present disclosure moves ciphering from PDCP 410 to the physical layer (PHY) 415 in order to achieve full ciphering in the physical layer. In some implementations such as the example of FIG. 4, an entire TB block 330 can be ciphered. In such implementations, the L2 headers (e.g., SDAP headers 314, PDCP headers 315, RLC headers 316a, 316b, MAC headers 317a, 317b) and MAC CE 318, well as IP Headers 311 and IP data payload 312 will be protected compared to address the data security concerns of conventional systems.

Though ciphering of the entire TB has advantages with respect to data security, these advantages are not without drawbacks. For example, demand for more HW remains with increasing peak data rates. In addition, given that some of the TB data was already encrypted (e.g., IP headers 311 and IP data 312), unnecessary double encryption of already encrypted data remains as every bit of the TB would be ciphered in such implementations. Also, ciphering happens late in the processing pipeline and becomes more time critical.

Though in some implementations, as described above with respect to FIG. 4, the entire TB is ciphered, the present disclosure is not so limited. Instead, FIG. 5 illustrates an example of a visual representation 500 of ciphering of one or more portions 522a, 522b, 522c of a transport block, according to some implementations.

In some implementations, the techniques of the present disclosure that move the ciphering of data from PDCP 510 to PHY 520, may only apply full ciphering only for smaller TBs that are less than a predetermined threshold size. In some implementations, the user of smaller TBs may arise, for example, in low Tput scenarios or for low Tput devices such as, for example, IOT devices.

Then, for larger TBs that are greater than a predetermined threshold size, the techniques of the present disclosure can be configured such that these larger TBs get ciphered partially. In such implementations, the present disclosure can be configured to, for example, cipher portions the TB that are not ciphered already as a result of, for example E2E communications by security on the application layer. Such portions of the TB to be ciphered can include, for example, MAC, RLC, PDCP, SDAP, and/or IP Headers. Though IP headers have, in the past, been ciphered, IP headers are included here as in modern systems IP headers may no longer be ciphered by PDCP.

The present disclosure provides novel Ciphering Control Info (CiphCtrl) 522 to exchange knowledge of the protected areas 522a, 522b, 522c of a TB 522 that are ciphered or are to be ciphered. Such ciphering control information 522 can be exchanged between sender and receiver in different ways. The ciphering control information can be exchanged between the UE and access node in a number of different ways. For example, in some implementations, the exchange of ciphering control information can be static or semi-static. In such implementations, the ciphering control information can be defined by specification or standards requirements imposed on the UE or access node. In other implementations, the ciphering control information can be Radio Resource Control (RRC). In such implementations, RRC signaling can be used to specify ciphering control information based on certain DCI formats, TB sizes, or frequency ranges. In some implementations, indicating ciphering control information via this type of RRC signaling can be useful when a fixed pattern of TB portions are to be ciphered.

In other implementations, ciphering control information can be specified via DCI on a per TB basis. In such implementations, IDs from one or more spec defined lookup tables or predetermined pattern IDs shared via RRC configuration can be used to indicate or exchange ciphering control information between a UE and access node.

In other implementations, ciphering control information can be signaled in-line with the TB. In some implementations, for example, this can be achieved using a newly defined TB header or UCI. Such implementations may have the drawback of increasing TB overhead. In such instances, however, PDCP can be stripped down to compensate for this TB increase. For example, cipher and integrity protect is removed. In some implementations, when moving "re-ordering" towards RLC the PDCP header can be shrinked to 0 Bytes per IP packet.

In some implementations, a TB can contain repetitive patterns. For example, in some implementations, repetitive patterns can occur for voice/video streaming with known packet sizes (e.g. ~40 Bytes audio packets), TCP streams with DATA and ACK packets (e.g. 1500 Bytes, 40 Bytes), or with respect to protection granularity within a TB.

Figure 6A:
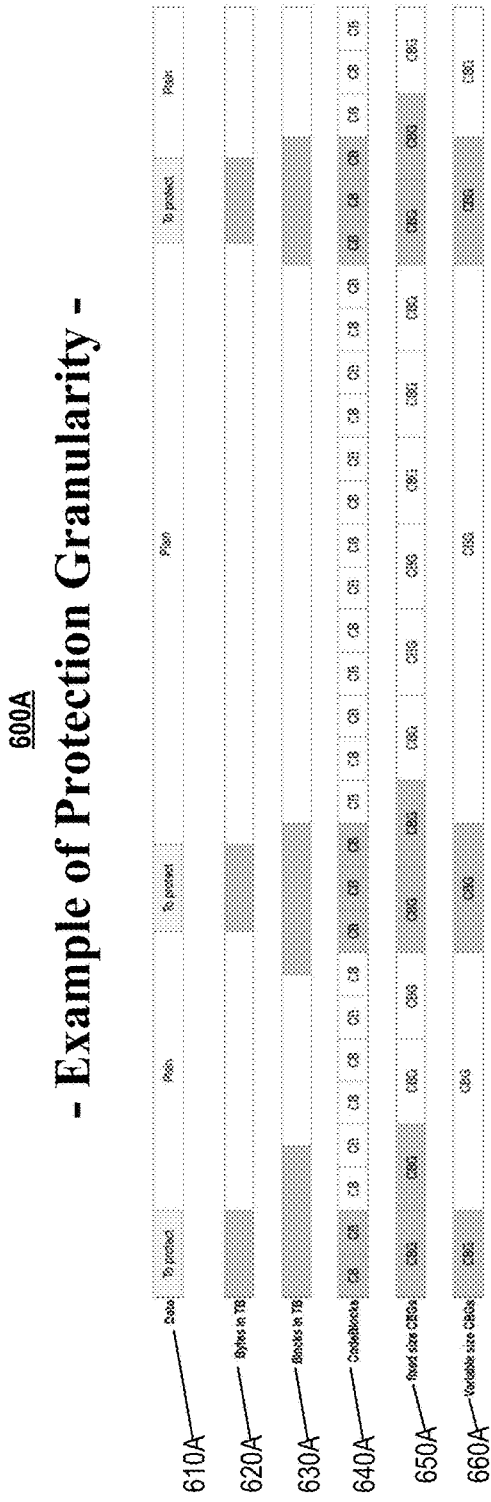
FIG. 6A illustrates an example of a visual representation of protection granularity of a transport block without obscuring the pattern with additional bytes, according to some implementations.

Regarding protection granularity within a TB, FIG. 6A illustrates an example of a visual representation 600A of protection granularity of a transport block without obscuring the pattern with additional bytes, according to some implementations. In 600A, example of protection granularity for repetitive patterns 610A can be processed at the byte level 620A, at the block level 630A, at the code block level 640A, in fixed size code block group (CBG) 650A, or in variable CBG 660A.

At the byte level 620A, partial ciphering protects the privacy of L2+IP headers, but may still reveal some traffic pattern information. Accordingly, in some implementations such as that depicted by FIG. 6B, 600B, additional data bytes 622B, 624B, 6264B can optionally be used to obscure the actual L2 headers, IP headers, or both.

Figure 6B:
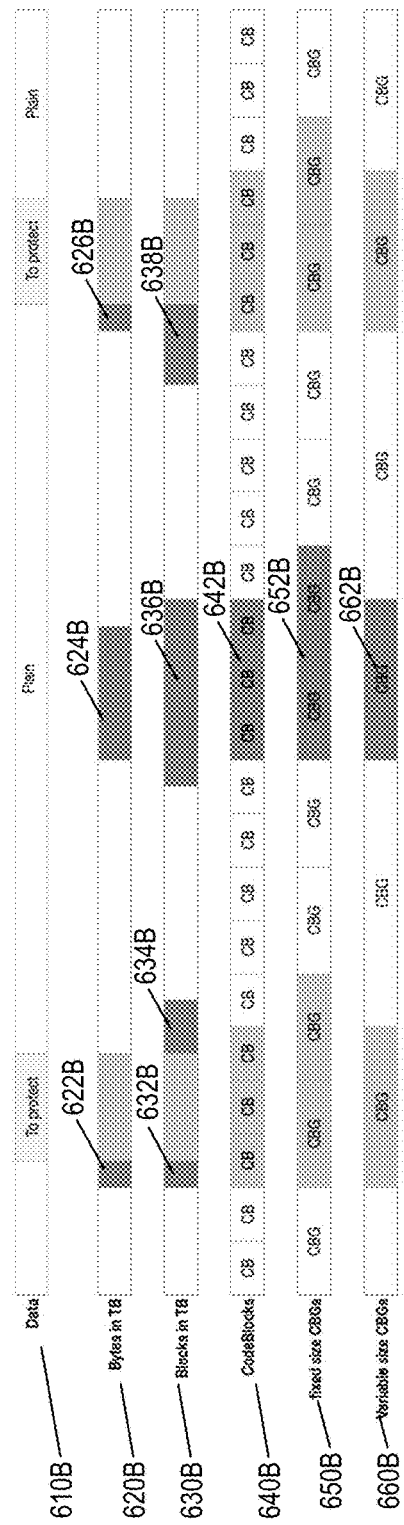
FIG. 6B illustrates an example of a visual representation of protection granularity of a transport block using additional bytes to obscure the pattern, according to some implementations.

At the block level 630A, generic block lengths can be used to reduce signaling overhead of exact byte borders. In some implementations, generic block lengths can be used. For example, an estimated maximum length of the L2 and IP headers (e.g., MAC+RLC+PDCP+SDAP+IP) can be header length of 70 Bytes (3+3+3+1+60). Accordingly, in such implementations, a generic code block length equivalent to 70 bytes or more can be selected in an effort to reduce overhead and attempt to obscure the exact byte boundaries. Like the byte level, a generic block length can be expanded to include additional block length 632B, 634B, 636B, 638B in order to further obscure the exact byte boundaries as shown in FIG. 6B, 600B.

At the code block (CB) level 640A complete CBs can be ciphered if the CB contains contain data that needs to be protected. Like the byte level 620A and the block level 630A, additional code blocks 642B can be used to further obscure exact by borders as shown in FIG. 6B, 600B.

With respect to fixed size CBGs 650A, such fixed size CBGs may be defined in 5G/NR. Like the aforementioned examples, a set of one or more fixed CBGs can be used to obscure exact byte level borders. And, optionally, additional fixed CBGs 652B can be used to further obscure such byte level borders as shown in FIG. 6B, 600B.

With respect to new variable CBGs 660A, such variable sized CBGs can be used that combine ciphered CBs and unciphered CBs. Like the aforementioned examples, a set of one or more variable CBGs can be used to obscure byte level borders. And, optionally, additional variable sized CBGs 662B can be used to further obscure such byte level borders as shown in FIG. 6B, 600B.

For implementations where partial protection is used, the ciphering control information is exchanged between the sender of TB and the recipient of the TB. The ciphering control information can, for example, provide information about the patterns of data within a TB that is ciphered or is to be ciphered to assist the recipient in deciphering a ciphered TB. Different examples of the types of information that can be included in ciphering control information are set forth in FIGS. 7A-7E.

Figure 7A:
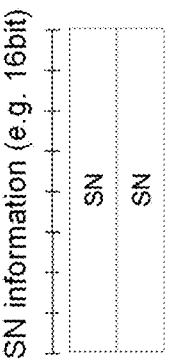
FIG. 7A illustrates an example of fields that can be included in ciphering control information, according to some implementations.

FIG. 7A illustrates a first example of fields that can be included in ciphering control information 700A, according to some implementations. In this example, the ciphering control information can provide one or more sequence numbers (SN). In some implementations, a sequence number can indicate a sequence of 8-bits, 16-bits, or the like. Alternatively, implicit SN counting can be applied. In some implementations, a SN can be indicated using, for example, 1-2 bytes.

Figure 7B:
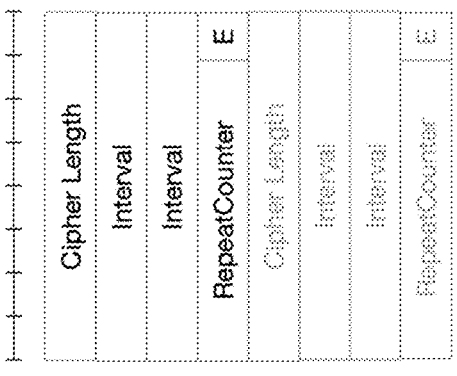
FIG. 7B illustrates another example of fields that can be included in ciphering control information, according to some implementations.

FIG. 7B illustrates another example of fields that can be included in ciphering control information 700B, according to some implementations. In this example, the ciphering control information 700B includes information describing a pattern within a TB that is ciphered or is to be ciphered at the bye level. Such an implementation may be associated with higher overhead than the ciphering control information of 700C, 700D, 700E, 700D. In this example of ciphering control information 700B, the ciphering control information can include cipher length and intervals between respective bytes or sets of bytes that are to be ciphered. In some implementations, the ciphering control information can also include a repeat counter to indicate a frequency with which the intervals repeat.

Figure 7C:
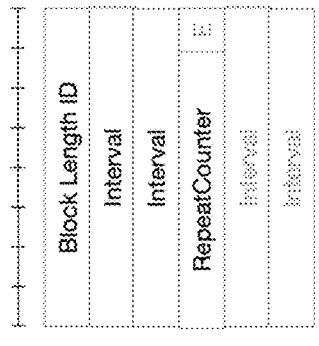
FIG. 7C illustrates another example of fields that can be included in ciphering control information, according to some implementations.

FIG. 7C illustrates another example of fields that can be included in ciphering control information 700C, according to some implementations. In this example, the ciphering control information 700C includes information describing a pattern within a TB that is ciphered or is to be ciphered at the block level. Such an implementation may be associated with less overhead than, for example, the ciphering control information of 700B for byte level ciphering control information. In this example of ciphering control information 700C, the ciphering control information can include a block length ID and intervals between respective blocks that are to be ciphered. In some implementations, the ciphering control information can also include a repeat counter to indicate a frequency with which the intervals repeat.

Figure 7D:
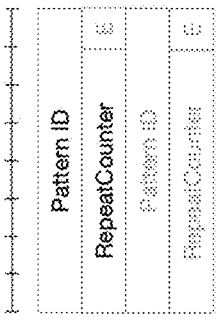
FIG. 7D illustrates another example of fields that can be included in ciphering control information, according to some implementations.

FIG. 7D illustrates another example of fields that can be included in ciphering control information 700D, according to some implementations. In this example, the ciphering control information 700D includes information describing a pattern within a TB that is ciphered or is to be ciphered using a pattern ID. Such an implementation may be associated with less overhead than, for example, the ciphering control information of 700B for byte level ciphering control information. In this example of ciphering control information 700D, the ciphering control information can include a pattern ID and a repeat counter to indicate a frequency with which the intervals repeat. A device receiving the ciphering control information 700D can then access a table that maps a pattern of data within a TB based to a respective pattern ID. Then, the receiving device can determine how to decipher a received TB based on the pattern obtained from the table using the pattern ID from the ciphering control information 700D. Likewise, a sending device may also maintain such a table and use the table to determine what pattern ID should be included in the ciphering control information 700D.

Figure 7E:
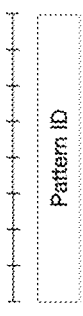
FIG. 7E illustrates another example of fields that can be included in ciphering control information, according to some implementations.

FIG. 7E illustrates another example of fields that can be included in ciphering control information 700E, according to some implementations. In this example, the ciphering control information 700E includes information describing a pattern within a TB that is ciphered or is to be ciphered using a pattern ID. Such an implementation may be associated with less overhead than, for example, the ciphering control information of 700B-700D. In this example of ciphering control information 700E, the ciphering control information can include a pattern. A device receiving the ciphering control information 700D can then access a table that maps a pattern of data within a TB based to a respective pattern ID. Then, the receiving device can determine how to decipher a received TB based on the pattern obtained from the table using the pattern ID from the ciphering control information 700D. Likewise, a sending device may also maintain such a table and use the table to determine what pattern ID should be included in the ciphering control information 700D. In some implementations, the accessed table may also include data corresponding to repeater. Alternatively, the repetitive nature of a pattern corresponding to a pattern ID may be implicit in the description of the pattern stored in the mapping table without the need for an express repeat counter.

One or more of the preceding examples such as 700D-700E may use pattern IDs. In such instances, a few bytes can be used to indicate the pattern ID. Whereas, for the examples 700B or 700C, serval bytes may have to be used to define byte level or block level information for varying patterns within the same TB.

In downlink channel, the ciphering control information can be carried via DL DCI, control information multiplexed in the TB, or via a novel TB block header that includes fields for the ciphering control information. In some implementations, when the ciphering control information is provided via downlink by control information multiplexed in the TB, this can be achieved in a manner similar to UCI.

In the uplink channel, the ciphering control information can be carried via UL using control information that is multiplexed in the TB or via a novel TB block header that includes fields for ciphering control information. In some implementations, when the ciphering control information is provided via uplink by control information multiplexed in the TB, this can be achieved in a manner similar to UCI.

FIG. 8A is an example of a visual representation 800A of partial ciphering of a transport block, according to some implementations. In the example of FIG. 8A, partial ciphering can include ciphering of a pattern of multiple different portions 812A, 814A, 816A at the byte level. As shown in 800A, the ciphering control information 810A can be communicated from the sending device to the recipient device and include information that identifies the pattern of multiple different portions 812A, 814A, 816A at the byte level within the TB 805. In some implementations, such ciphering control information can be implemented using, for example, a ciphering control information 700B. In some implementations, the TB 805 can also be associated with TB CRC data 818A to be used for cyclic redundancy check. In some implementations, this TB CRC data 818A may also be ciphered. The sending device can include a UE or an access node. Likewise, the receiving device may be an access node or UE.

The pattern of multiple different portions 812A, 814A, 816A identified by the ciphering control information 810A may be ciphered by a sending device at a predetermined time. In some implementations, the predetermined time can be after TB CRC attachment, as shown with reference to FIG. 8B.

FIG. 8B is a flowchart of an example of a process 800B for physical layer processing of transport blocks, according to some implementations. In some implementations, the process 800B refers to a process for multiplexing TB blocks as specified by TS 38.212, § 7. An example of this process is captured by 800B.

The process 800B can begin with the sending device performing TB CRC attachment 802B and then, in accordance with the example of FIG. 8A, 800A, perform L1 ciphering 804B of the pattern of multiple portions 812a, 814A, 816A of the TB 805 identified by the ciphering control information 810A. The sending device can continue to execution the process 800B after ciphering the pattern of multiple portions 812a, 814a, 816a of TB 805 by performing LDPC BG selection 806B, CB Segmentation & CRC attachment 808B, channel coding 810B, rate matching 812B, CB concatenation 814B, scrambling 816B, modulation 818B, layer mapping 820B, antenna port mapping 822B, mapping to VRB 824B, and mapping from VRB to PRB 826B.

Though the example of 8A and 8B is described as being performed on the byte level, the same process can be performed on the block level using, for example, cipher control information 700C. In such implementations where the ciphering is done on the byte or block level, the predetermined time for ciphering may be, for example after TB CRC attachment (802B). In such implementations, byte exact ciphering may have more signaling overhead when viewed, comparatively, with block level ciphering where signaling fixed block sizes for protected areas comes with less signaling but more cipher processing (more bits to be protected).

In some implementations, HARQ retx shall be ciphered in the same way as for the initial transmission to allow concatenation of CBs from different HARQ attempts and still be able to decipher it.

In some implementations, ciphering control information in TB header can be carried via TB Header or via DCPUCI. When ciphering control information is carried via the TB header, the TB header can carry more bits than the DCPUCI. However, if the TB header is missing (e.g., decoding of the containing CB failed) the deciphering of the TB needs to be deferred.

There are multiple benefits of the implementation of FIGS. 8A and 8B. For example, PDCP overhead can be reduced in such implementations. In addition, less bits need to be ciphered compared relative to ciphering after Channel Coding. In addition, additional implicit integrity protection can be achieved when the TB CRC is ciphered as well, since the TB CRC is checked after deciphering.

Figures 9A, 9B:
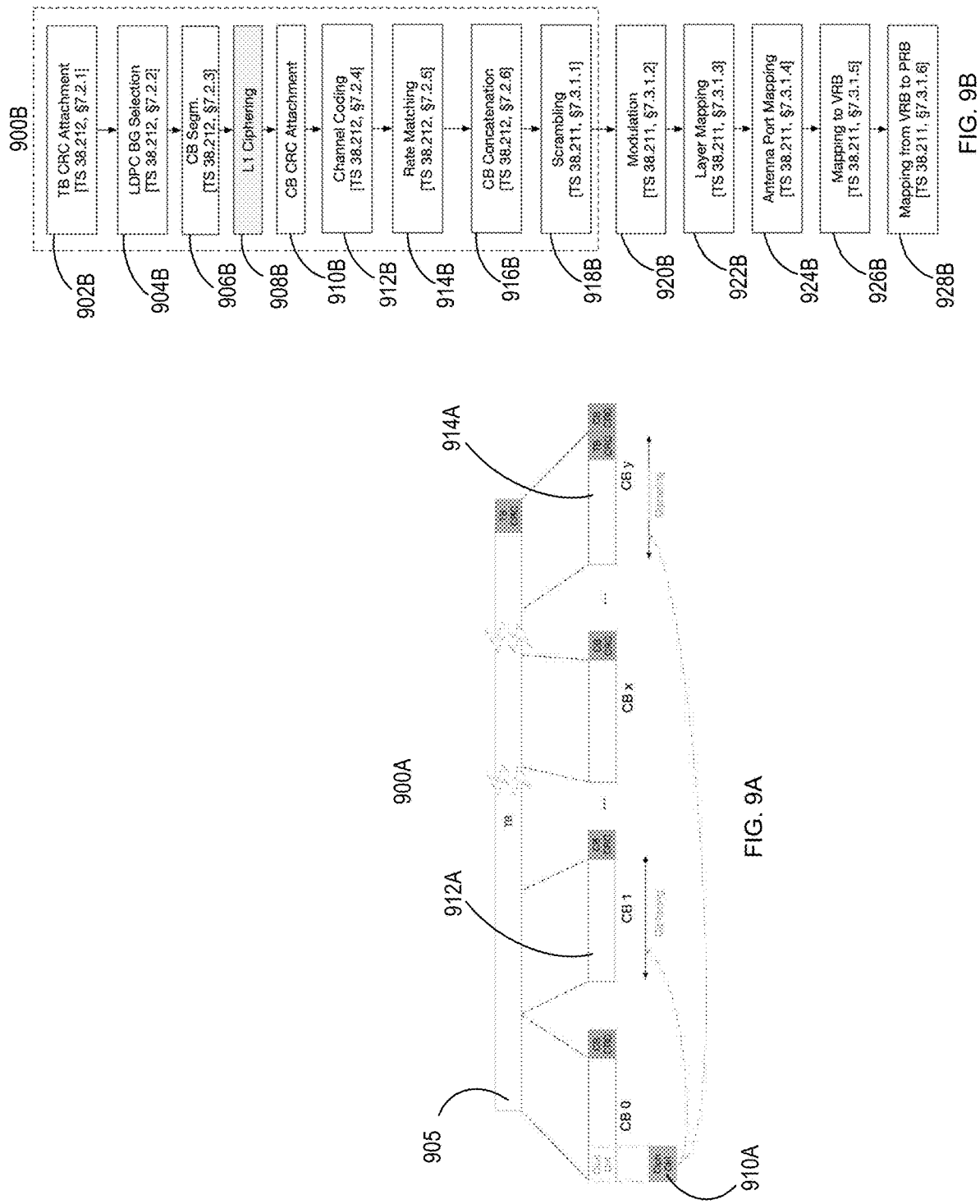
FIG. 9A is another example of a visual representation of partial ciphering of a transport block, according to some implementations.
FIG. 9B is another example of a flowchart of a physical layer processing of a transport block, according to some implementations.

FIG. 9A is another example of a visual representation 900A of partial ciphering of a transport block, according to some implementations. In the example of FIG. 9A, partial ciphering can include ciphering of a pattern of multiple different portions 912A, 914A at the code block (CB) level. As shown in 900A, the ciphering control information 910A can be communicated from the sending device to the recipient device and include information that identifies the pattern of multiple different portions 912A, 914A at the code level within the TB 905. In some implementations, such ciphering control information can be implemented using, for example, a ciphering control information 700C. In this example of FIG. 9A, the TB CRC is also ciphered via the yth CB in portion 918A. However, the CB CRC data is not ciphered. The sending device can include a UE or an access node. Likewise, the receiving device may be an access node or UE.

FIG. 9B is another example of a flowchart 900B of a process for multiplexing transport blocks, according to some implementations. In some implementations, the process 900B refers to a process for multiplexing TB blocks as specified by TS 38.212, § 7. An example of this process is captured by 900B, which is generally the same as the process 800B with the exception of the predetermined time when L1 ciphering of code block 905 is performed.

The process 900B can begin with the sending device performing TB CRC attachment 902B, LDPC BG selection 904B, and CB Segmentation 906B. Then, in accordance with example of FIG. 9B, 900B, after performance of the CB Segmentation and before performance of the CRC attachment stage 910B, the sending device can perform L1 ciphering 908B of the pattern of multiple portions 912A, 914A of the TB 905 identified by the ciphering control information 910A. The sending device can continue to execution the process 900B after ciphering the pattern of multiple portions 912A, 914A of the TB 905 identified by the ciphering control information 910A by performing CB RCR attachment (910B), channel coding 912B, rate matching 914B, CB concatenation 916B, scrambling 918B, modulation 920B, layer mapping 922B, antenna port mapping 924B, mapping to VRB 926B, and mapping from VRB to PRB 930B.

In the example of FIG. 9A and FIG. 9B, ciphering is performed on the CB level before CB CRC attachment at stage 910B. In such implementations, the sending device can cipher whole CB if it contains bits that are indicated by the ciphering control information 910A as being bits that are to be ciphered. In such implementations, the CB CRC is left unciphered for each CB is left unciphered.

In such implementations of FIGS. 9A and 9B, not ciphering the CB CRC saves processing on decoding errors as deciphering the receiving side can be avoided. In such implementations, however, an attacker can attempt to inject forged CBs with correct CRCs and cause the receiver to perform deciphering, but TB is still CRC protected and implicitly integrity protected if the last CB containing the TB CRC is ciphered, hence manipulated TBs shall fail CRC. As a result, savings in processing can be achieved up front and supplemental processing can be performed at the TB level in the event an attack occurs.

In comparison to the example of FIG. 8A and FIG. 8B, the example of FIGS. 9A and 9B may potentially have more bits that are ciphered due to the CB granularity. However, the example of FIGS. 9A and 9B still provides the advantage of a reduction in PDCP overhead. Additionally, or alternatively, less bits need to be ciphered compared relative to ciphering after Channel Coding In some implementations, the ciphering control information 910A in a TB header can be carried via TB Header or via DCPUCI. In some implementations, the TB header can carry more bits than the DCPUCI. However, if the TB header is missing (e.g., decoding of the containing CB failed) the deciphering of the CBs needs to be deferred.

Figures 10A, 10B:
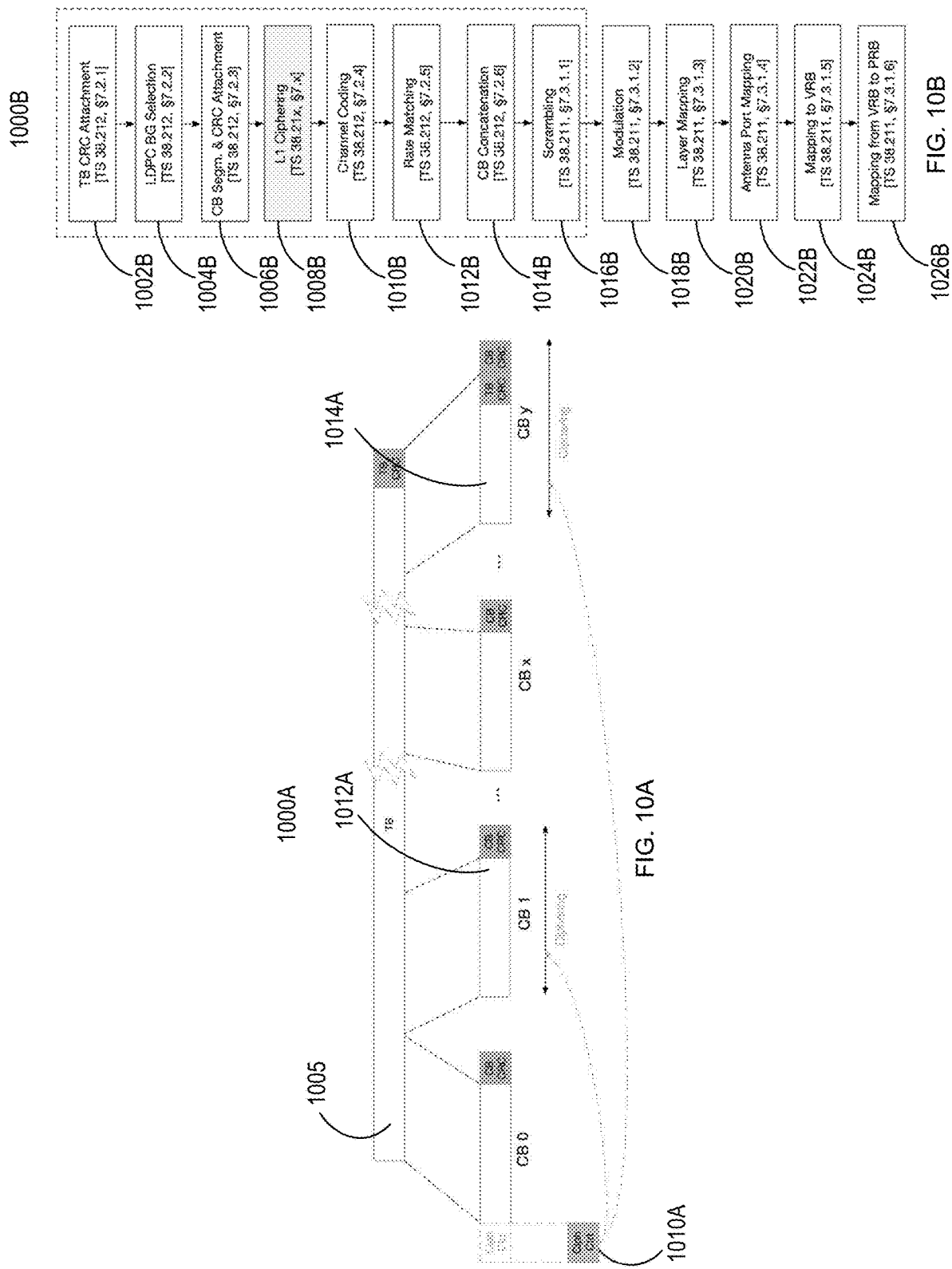
FIG. 10A is another example of a visual representation of partial ciphering of a transport block, according to some implementations.
FIG. 10B is another example of a flowchart of a physical layer processing of a transport block, according to some implementations.

FIG. 10A is another example of a visual representation 1000A of partial ciphering of a transport block, according to some implementations. In the example of FIG. 10A, partial ciphering can include ciphering of a pattern of multiple different portions 1012A, 1014A at the code block (CB) level. As shown in 1000A, the ciphering control information 1010A can be communicated from the sending device to the recipient device and include information that identifies the pattern of multiple different portions 1012A, 1014A at the code level within the TB 1005. In some implementations, such ciphering control information can be implemented using, for example, a ciphering control information 700C. In this example of FIG. 9A, the TB CRC is also ciphered via the yth CB in portion 1018A. In addition, CB CRC for each CB is also ciphered. The sending device can include a UE or an access node. Likewise, the receiving device may be an access node or UE.

FIG. 10B is another example of a flowchart of a process for multiplexing transport blocks, according to some implementations. In some implementations, the process 1000B refers to a process for multiplexing TB blocks as specified by TS 38.212, § 7. An example of this process is captured by 1000B, which is generally the same as the process 800B or 900B with the exception of the predetermined time when L1 ciphering of code block 1005 is performed in FIG. 10B.

The process 1000B can begin with the sending device performing TB CRC attachment 1002B, LDPC BG selection 1004B, and CB Segmentation and CRC attachment 1006B.

Then, in accordance with example of FIG. 10B, 1000B, after performance of the CB Segmentation and CRC attachment stage 1006B, the sending device can perform L1 ciphering 1008B of the pattern of multiple portions 1012A, 1014A of the TB 1005 identified by the ciphering control information 1010A. The sending device can continue to execution the process 1000B after ciphering the pattern of multiple portions 1012A, 1014A of the TB 1005 identified by the ciphering control information 1010A by performing channel coding 1010B, rate matching 1012B, CB concatenation 1014B, scrambling 1016B, modulation 1018B, layer mapping 1020B, antenna port mapping 1022B, mapping to VRB 1024B, and mapping from VRB to PRB 1026B.

In the example of FIG. 10A and FIG. 10B, ciphering is performed on the CB level after the CB segmentation and CRC attachment stage 1006B. In such implementations, the sending device can cipher whole CB, which includes the CB and CB CRC when the CB contains bits that are indicated by the ciphering control information 910A as being bits that are to be ciphered. In such implementations, the ciphered CB is protected against manipulation.

Comparing the implementation of FIG. 10A and FIG. 10B (i.e., whole CB including CB CRC is ciphered) against the implementation of FIG. 9A and FIG. 9B (i.e., CB is ciphered by not CB CRC), whereas deciphering can be avoided on the implementation of FIG. 9A and FIG. 9B when a decoding error occurs, deciphering on the receiving end for implementation of FIG. 10A and FIG. 10B is required in the event of a decoding error in order to perform a CRC check. This is because, in the implementation of FIG. 10A and FIG. 10B, the CB CRC is ciphered.

However, the example of FIGS. 10A and 10B still provides the advantage of a reduction in PDCP overhead. Additionally, or alternatively, less bits need to be ciphered compared relative to ciphering after Channel Coding In some implementations, the ciphering control information in a TB header can be carried via TB Header or via DCPUCI. In some implementations, the TB header can carry more bits than the DCPUCI. However, if the TB header is missing (e.g., decoding of the containing CB failed) the deciphering of the CBs needs to be deferred.

In some implementations, the ciphering control information 1010A in a TB header can be carried via TB Header or via DCPUCI. In some implementations, the TB header can carry more bits than the DCPUCI, but in such instances, the TB header cannot be part of the CBs and instead it needs to be a separate, unciphered, coded block to allow the receive to decipher/decode it before the regular CBs can be deciphered. Additionally, or alternatively, if the TB header is missing (e.g., decoding of the containing CB failed) the deciphering of the CBs needs to be deferred.

Figure 11A:
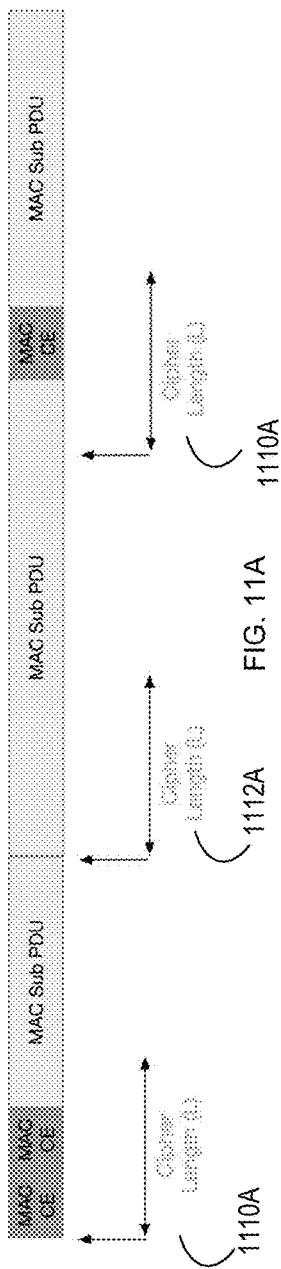
FIG. 11A is an example of a transport block that has been constructed with a particular pattern, according to some implementations.

In such implementations, a sender or transmission (TX) entity (e.g., UE) may construct the TB in a favorable way to match a certain pattern already on the higher layers that is to be protected via ciphering. For example, in some implementations, a sender or TX entity can schedule only certain logical channels (LCs) with similar packet sizes or packets sizes that can be covered by a certain pattern. In some implementations, for example as shown in the constructed TB 1100A of FIG. 11A, MAC padding or other MAC CEs can be added in-between subPDUs to shift the portions 1110A, 1112A, 1114A of the TB that are to be protected via ciphering into a particular pattern. As shown in the constructed TB 1100A of FIG. 11A, MAC CEs are interspersed in and covered by regular L+I tuples.

Figure 11B:
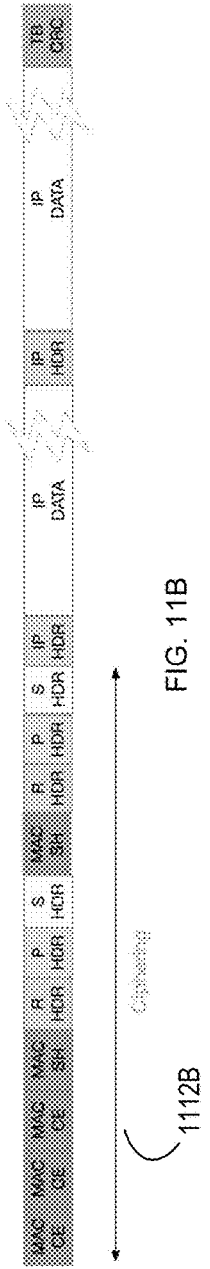
FIG. 11B is another example of a transport block that has been constructed with a particular pattern, according to some implementations.

By way of another example of a constructed TB, L2 headers and control elements can be organized in a consecutive way in the higher layers already or PHY may move the areas together to be protected via ciphering. An example of constructed TB 1100B that is constructed to organize the L2 headers together into a portion 112B of a transport block 1100B that is to be protected is shown in FIG. 11B.

Figure 11C:
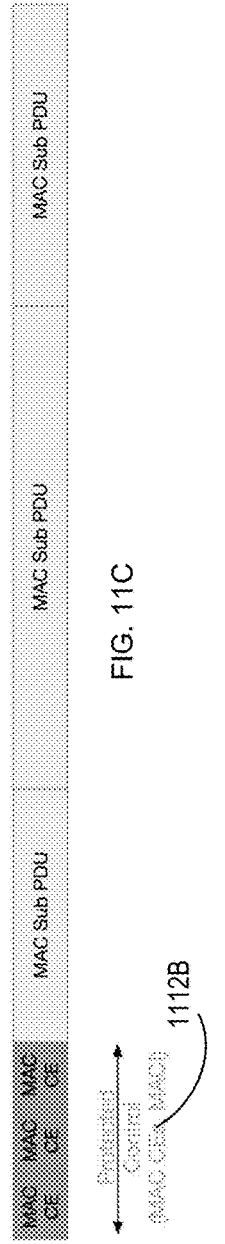
FIG. 11C is another example of a transport block that has fields that fall outside of a repetitive pattern, according to some implementations.

By way of another example of a constructed TB, special regions may be defined to protect things that fall out of repetitive patterns of MAC SubPDUs. An example of a constructed TB 1100C that is constructed to create a special region 112B for MAC CE that is to be protected via ciphering in the beginning of TB is shown in FIG. 11C. In some implementations, the special region can be implemented via a TB header of MAC CE Length equal to X bytes.

Figure 11D:
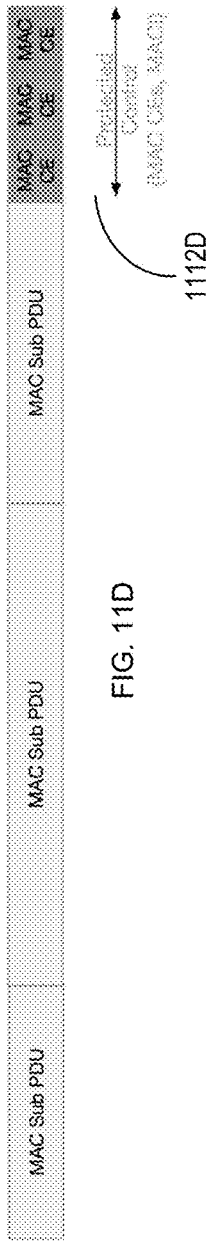
FIG. 11D is another example of a transport block that has fields that fall outside of a repetitive pattern, according to some implementations.

By way of another example of a constructed TB, special region 1112D that is to be protected via ciphering can be created in a constructed TB 1100D in order to organize MAC CE into the end of TB 1100D. As shown in FIG. 11D, the special region 1112D includes the MAC CE area in the end of the constructed TB 110D. In some implementations, the special region can be implemented via a TB header of MAC CE Length equal to X bytes.

Figure 12B:
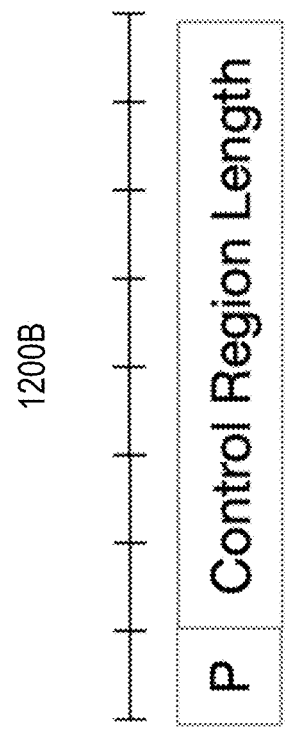
FIG. 12B is another example of control region information that can included in ciphering control information for a transport block such as the transport blocks of FIG. 11C or FIG. 11D having special regions that fall outside of a repetitive pattern.
Figure 12A:
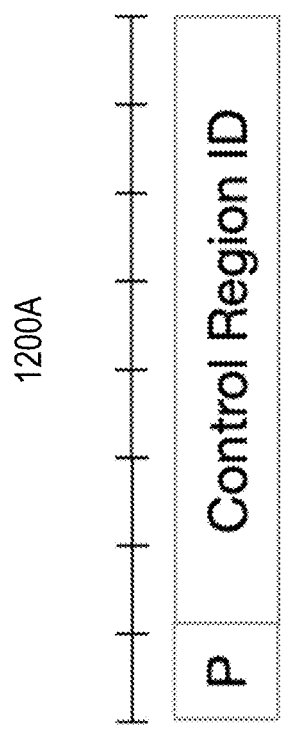
FIG. 12A is an example of control region information that can included in ciphering control information for a transport block such as the transport blocks of FIG. 11C or FIG. 11D having special regions that fall outside of a repetitive pattern.

In some implementations, a constructed TB may have particular control regions defined as corresponding to one or more particular types of data such as, for example, L2 header, MAC CE, or the like. In such implementations, the ciphering control information 1200A or 1200B can be used provided to the recipient to indicate, to the recipient, wherein the TB the control regions are located. In some implementations, the ciphering control information 1200A can include a control region ID and then a recipient device can use a table mapping control region IDs to a portion of a TB as shown in FIG. 12A. In other implementations, the ciphering control information 1200B can include a control region length as shown in FIG. 12B. in such implementations, the receiving device can use the control region length to determine the location of the control region or special region with the constructed TB. In some implementations, both the control region ID and control region length can be included in the ciphering control information.

The present disclosure provides multiple benefits. For example, L2 overhead can be reduced by removing PDCP headers and MACI. In some implementations, additional, but limited, signaling overhead in the TB (Cipher Control Info) will be added. Another benefit is that increased privacy can be achieved as L2 Headers, MAC CEs and IP Headers are ciphered and traffic patterns can be obscured. Additionally, the amount of bytes to be protected is reduced extremely by avoiding the double ciphering of application data. For example, L2 Headers per IP packet may include only 7 Bytes. In such implementations, this can include 3 MAC bytes+3 RLC bytes+1 SDAP byte. An NR based example calculation with removed PDCP header+MACI overhead. The IP Header for IPv4 header size equals a minimum of 20 Bytes and for IPv6 header size equals a minimum of 40 Bytes. For an 8000 Byte IPv4 packet, the total bytes to be ciphered is approx. 27 out of 8007 bytes, or approximately 0.3% of TB need to be ciphered. For a 1500 Byte IPv4 packet, the total bytes to be ciphered is approx. 47 bytes out of 1507 bytes, or about 1.8% of TB need to be ciphered.

Additional benefits include significant reduction of HW capabilities (area/power) possible as ciphering throughput shrinks drastically. Ciphering can be part of TB encoding during/after assembly.

Figure 13:
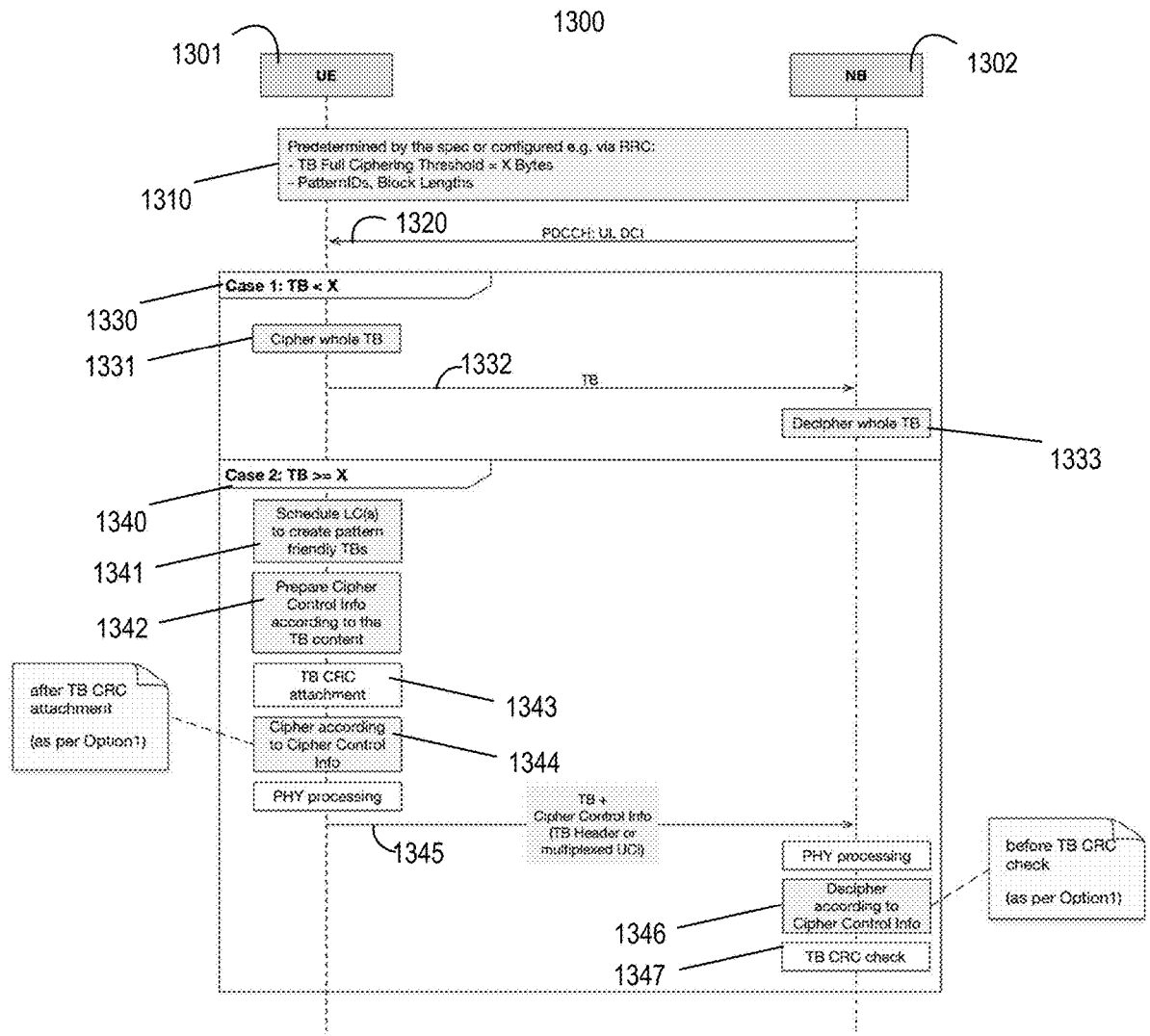
FIG. 13 is flowchart of an example of a process for ciphering data in the physical uplink channel, according to some implementations.

To ensures that no data is transmitted insecure it could be an option to ciphering on the complete headers and data but limit the KPIs (e.g. Tput, Latency, priority) for such kind of traffic in order to limit the HW requirements FIG. 13 is flowchart of an example of a process 1300 for ciphering data in the physical uplink channel, according to some implementations. The process will be described a process flow between the UE 1301 as the sending device and the access node or NB 1302 as the receiving device.

Prior to performance of the process 1300, the access node can configure 1310 the UE 1302 with a TB ciphering threshold of X bytes, where X is any integer value greater than 1, a table of one or more pattern IDs, and a table of one or more block lengths. This configuration can be achieved, for example, via RRC signaling from the access node 1302 that maps certain DCI formats, TB sizes, or FR ranges to a particular pattern. In some implementations, this configuration is achieved via specification.

The process 1300 begins with the access node scheduling 1302 the UE to transmit something in uplink using PDDH: UL DCI. The UE then decodes the DCI and determines whether the transport block (TB) for transmission is less than the predetermined threshold of X bytes. If the UE determines that the TB for transmission is less than X bytes, the UE can follow case 1 at 1330, cipher the entire TB at 1331, and transmit the TB to the access node 1301, which deciphers the whole TB at 1333.

Alternatively, if the UE determines that the TB for transmission is greater than X bytes, the UE 1302 can follow case 2 at 1340 and perform partial ciphering. The begins performance of partial ciphering by scheduling 1341 logical channels (LCs) to create pattern-friendly TBs, preparing 1342 cipher control information according to the TB content, and performing TB CRC attachment 1343. Then, in this example of 1300 which corresponds to the implementation of FIGS. 8A and 8B, the UE ciphers 1344 the TB according to the cipher control information after performing TB CRC attachment 1343. Then, the UE performs physical layer processing to communicate 1345 the partially ciphered TB and the cipher control information to the access node 1302. The ciphering control information can be communicated as part of the TB header or multiplexed UCI. The access node 1302 receives the ciphering control information and the partially ciphered TB during physically layer processing. Then, the access node 1302 deciphers 1346 the received partially ciphered TB according to the cipher control information before TB CRC check per the implementation of FIGS. 8A and 8B and then performs TB CRC check 1347.

Though the process 1300 is performed with ciphering at the predetermined time in accordance with the implementation of FIGS. 8A and 8B, the present disclosure is not so limited. Instead, in some implementations, the process 1300 can be modified to accommodate the ciphering at predetermined times as described with reference to FIGS. 9A and 9B and FIGS. 10A and 10B accordingly.

Figure 14:
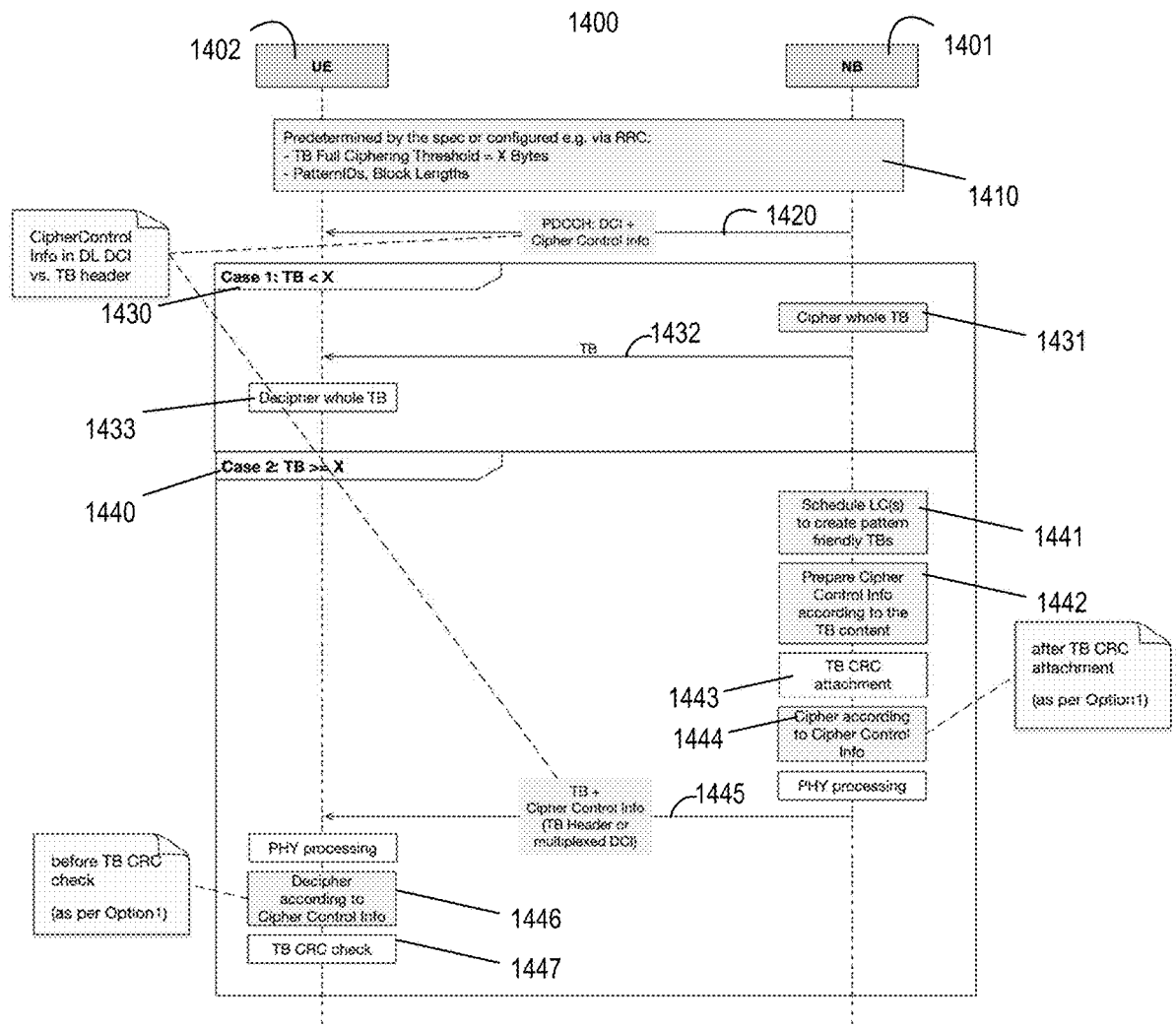
FIG. 14 is a flowchart of an example of a process for ciphering data in physical downlink channel, according to some implementations.

FIG. 14 is a flowchart of an example of a process 1400 for ciphering data in physical downlink channel, according to some implementations. The process will be described a process flow between the UE 1401 as the receiving device and the access node or NB 1402 as the sending device.

Prior to performance of the process 1400, the access node can configure 1410 the UE 1402 with a TB ciphering threshold of X bytes, where X is any integer value greater than 1, a table of one or more pattern IDs, and a table of one or more block lengths. This configuration can be achieved, for example, via RRC signaling from the access node 1402 that maps certain DCI formats, TB sizes, or FR ranges to a particular pattern. In some implementations, this configuration is achieved via specification.

The process 1400 begins with the access node communicating 1420 cipher control information to the UE 1402. In some implementations, the cipher control information can be communicated via DCI in PDCCH.

The access node 1402 determines whether a transport block (TB) for transmission to the UE 1402 is less than the predetermined threshold of X bytes. If the access node determines that the TB for transmission is less than X bytes, the access node can follow case 1 at 1430, cipher the entire TB at 1431, and transmit 1432 the TB to the UE 1402, which deciphers the whole TB at 1433.

Alternatively, if the access node 1401 determines that the TB for transmission is greater than X bytes, the access node 1401 can follow case 2 at 1440 and perform partial ciphering. The access node 1401 begins performance of partial ciphering by scheduling 1441 logical channels (LCs) to create pattern-friendly TBs, preparing 1442 cipher control information according to the TB content, and performing TB CRC attachment 1443. Then, in this example of 1400 which corresponds to the implementation of FIGS. 8A and 8B, the access node 1401 ciphers 1444 the TB according to the cipher control information after performing TB CRC attachment 1443. Then, the access node 1401 performs physical layer processing to communicate 1445 the partially ciphered TB and the cipher control information to the UE 1402. The ciphering control information can be communicated as part of the TB header or multiplexed UCI. The UE 1402 receives the ciphering control information and the partially ciphered TB during physically layer processing. Then, the UE 1402 deciphers 1446 the received partially ciphered TB according to the cipher control information before TB CRC check per the implementation of FIGS. 8A and 8B and then performs TB CRC check 1447.

Though the process 1400 is performed with ciphering at the predetermined time in accordance with the implementation of FIGS. 8A and 8B, the present disclosure is not so limited. Instead, in some implementations, the process 1400 can be modified to accommodate the ciphering at predetermined times as described with reference to FIGS. 9A and 9B and FIGS. 10A and 10B accordingly.

Figure 15:
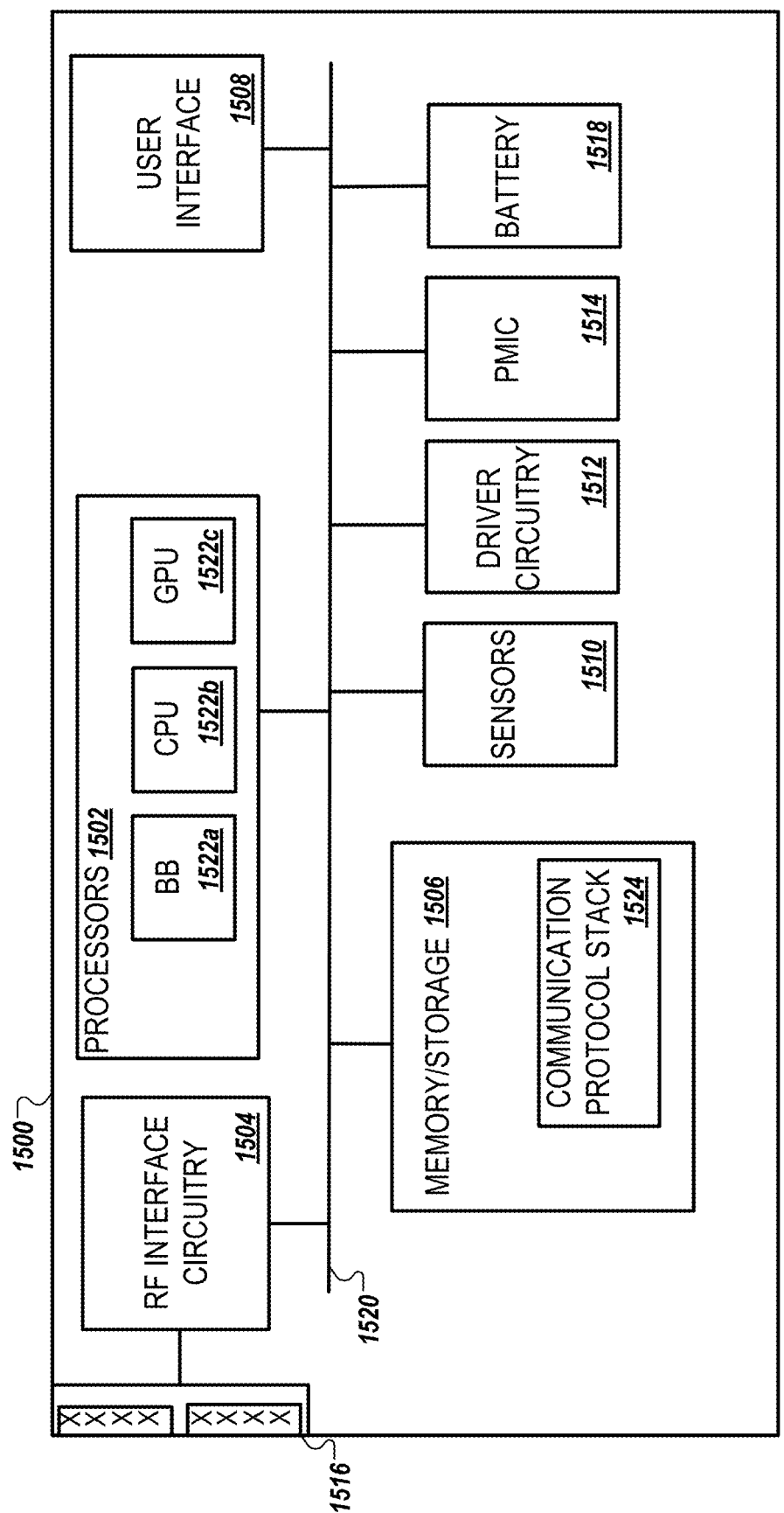
FIG. 15 illustrates a user equipment (UE), according to some implementations.

FIG. 15 illustrates a UE 1500, according to some implementations. The UE 1500 may be similar to and substantially interchangeable with UE 102 of FIG. 1.

The UE 1500 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 1500 may include processors 1502, RF interface circuitry 1504, memory/storage 1506, user interface 1508, sensors 1510, driver circuitry 1512, power management integrated circuit (PMIC) 1514, antenna structure 1516, and battery 1518. The components of the UE 1500 may be implemented as integrated circuits (ICs), portions thereof, discrete electronic devices, or other modules, logic, hardware, software, firmware, or a combination thereof. The block diagram of FIG. 15 is intended to show a high-level view of some of the components of the UE 1500. However, some of the components shown may be omitted, additional components may be present, and different arrangement of the components shown may occur in other implementations.

The components of the UE 1500 may be coupled with various other components over one or more interconnects 1520, which may represent any type of interface, input/output, bus (local, system, or expansion), transmission line, trace, optical connection, etc. that allows various circuit components (on common or different chips or chipsets) to interact with one another.

The processors 1502 may include processor circuitry such as, for example, baseband processor circuitry (BB) 1522A, central processor unit circuitry (CPU) 1522B, and graphics processor unit circuitry (GPU) 1522C. The processors 1502 may include any type of circuitry or processor circuitry that executes or otherwise operates computer-executable instructions, such as program code, software modules, or functional processes from memory/storage 1506 to cause the UE 1500 to perform operations as described herein.

In some implementations, the baseband processor circuitry 1522A may access a communication protocol stack 1524 in the memory/storage 1506 to communicate over a 3GPP compatible network. In general, the baseband processor circuitry 1522A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 1504. The baseband processor circuitry 1522A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 1506 may include one or more non-transitory, computer-readable media that includes instructions (for example, communication protocol stack 1524) that may be executed by one or more of the processors 1502 to cause the UE 1500 to perform various operations described herein. The memory/storage 1506 include any type of volatile or non-volatile memory that may be distributed throughout the UE 1500. In some implementations, some of the memory/storage 1506 may be located on the processors 1502 themselves (for example, L1 and L2 cache), while other memory/storage 1506 is external to the processors 1502 but accessible thereto via a memory interface. The memory/storage 1506 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1504 may include transceiver circuitry and radio frequency front module (RFEM) that allows the UE 1500 to communicate with other devices over a radio access network. The RF interface circuitry 1504 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1516 and proceed to filter and amplify (with a low-noise amplifier) the signal. The signal may be provided to a receiver of the transceiver that downconverts the RF signal into a baseband signal that is provided to the baseband processor of the processors 1502.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1516. In various implementations, the RF interface circuitry 1504 may be configured to transmit/receive signals in a manner compatible with NR access technologies.

The antenna 1516 may include antenna elements to convert electrical signals into radio waves to travel through the air and to convert received radio waves into electrical signals. The antenna elements may be arranged into one or more antenna panels. The antenna 1516 may have antenna panels that are omnidirectional, directional, or a combination thereof to enable beamforming and multiple input, multiple output communications. The antenna 1516 may include microstrip antennas, printed antennas fabricated on the surface of one or more printed circuit boards, patch antennas, phased array antennas, etc. The antenna 1516 may have one or more panels designed for specific frequency bands including bands in FR1 or FR2.

The user interface 1508 includes various input/output (I/O) devices designed to enable user interaction with the UE 1500. The user interface 1508 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1500.

The sensors 1510 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1512 may include software and hardware elements that operate to control particular devices that are embedded in the UE 1500, attached to the UE 1500, or otherwise communicatively coupled with the UE 1500. The driver circuitry 1512 may include individual drivers allowing other components to interact with or control various input/output (I/O) devices that may be present within, or connected to, the UE 1500. For example, driver circuitry 1512 may include a display driver to control and allow access to a display device, a touchscreen driver to control and allow access to a touchscreen interface, sensor drivers to obtain sensor readings of sensor circuitry 1510 and control and allow access to sensor circuitry 1510, drivers to obtain actuator positions of electro-mechanic components or control and allow access to the electro-mechanic components, a camera driver to control and allow access to an embedded image capture device, audio drivers to control and allow access to one or more audio devices.

The PMIC 1514 may manage power provided to various components of the UE 1500. In particular, with respect to the processors 1502, the PMIC 1514 may control power-source selection, voltage scaling, battery charging, or DC-to-DC conversion.

In some implementations, the PMIC 1514 may control, or otherwise be part of, various power saving mechanisms of the UE 1500. A battery 1518 may power the UE 1500, although in some examples the UE 1500 may be mounted deployed in a fixed location, and may have a power supply coupled to an electrical grid. The battery 1518 may be a lithium ion battery, a metal-air battery, such as a zinc-air battery, an aluminum-air battery, a lithium-air battery, and the like. In some implementations, such as in vehicle-based applications, the battery 1518 may be a typical lead-acid automotive battery.

Figure 16:
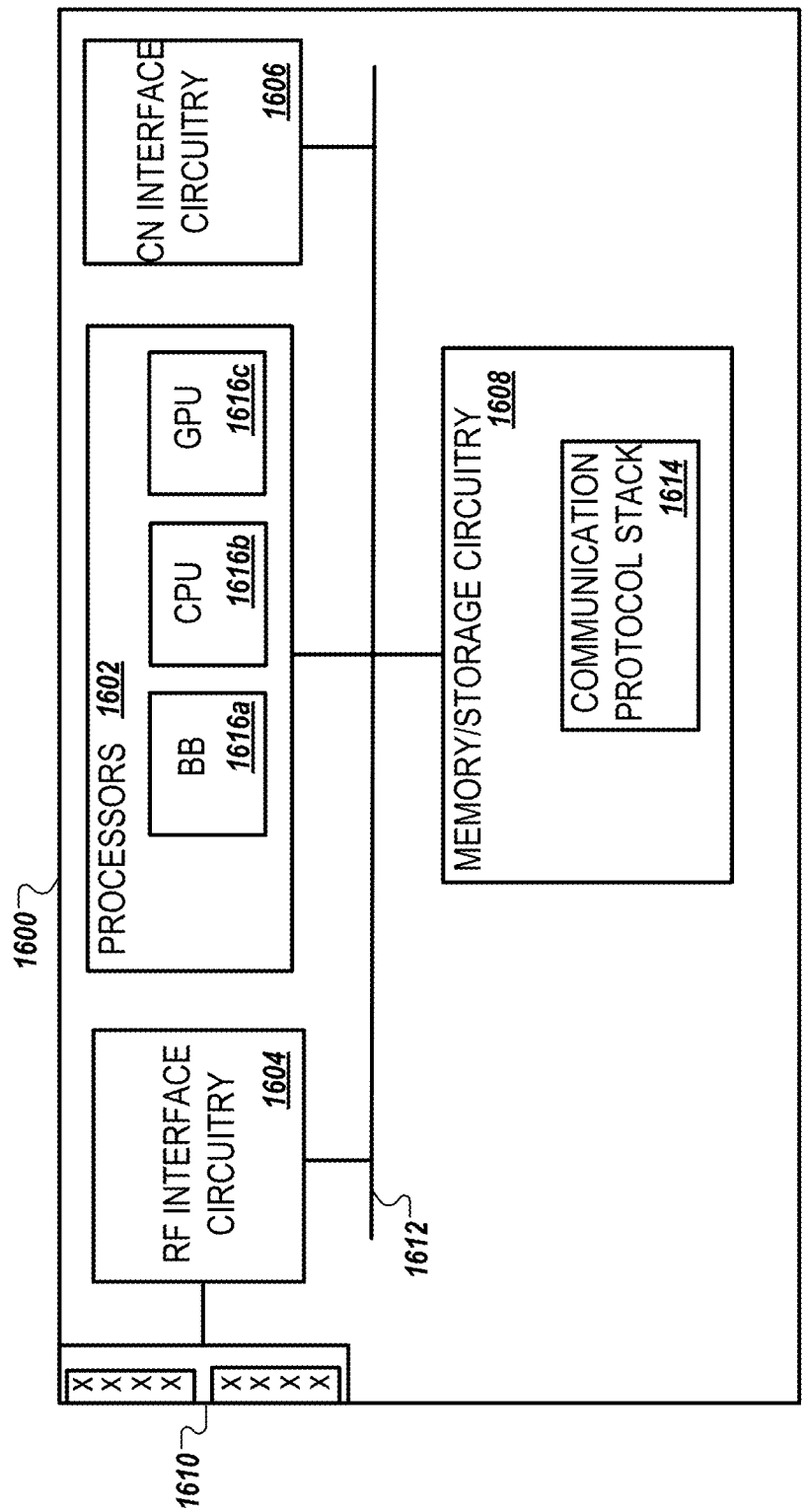
FIG. 16 illustrates an access node, according to some implementations.

FIG. 16 illustrates an access node 1600 (e.g., a base station or gNB), according to some implementations. The access node 1600 may be similar to and substantially interchangeable with base station 104. The access node 1600 may include processors 1602, RF interface circuitry 1604, core network (CN) interface circuitry 1606, memory/storage circuitry 1608, and antenna structure 1610.

The components of the access node 1600 may be coupled with various other components over one or more interconnects 1612. The processors 1602, RF interface circuitry 1604, memory/storage circuitry 1608 (including communication protocol stack 1614), antenna structure 1610, and interconnects 1612 may be similar to like-named elements shown and described with respect to FIG. 15. For example, the processors 1602 may include processor circuitry such as, for example, baseband processor circuitry (BB) 1616A, central processor unit circuitry (CPU) 1616B, and graphics processor unit circuitry (GPU) 1616C.

The CN interface circuitry 1606 may provide connectivity to a core network, for example, a 5th Generation Core network (5GC) using a 5GC-compatible network interface protocol such as carrier Ethernet protocols, or some other suitable protocol. Network connectivity may be provided to/from the access node 1600 via a fiber optic or wireless backhaul. The CN interface circuitry 1606 may include one or more dedicated processors or FPGAs to communicate using one or more of the aforementioned protocols. In some implementations, the CN interface circuitry 1606 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 1600 that operates in an NR or 5G system (for example, a gNB), and the term "E-UTRAN node" or the like may refer to an access node 1600 that operates in an LTE or 4G system (e.g., an eNB). According to various implementations, the access node 1600 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 1600 may be implemented as one or more software entities running on server computers as part of a virtual network, which may be referred to as a CRAN and/or a virtual baseband unit pool (vBBUP). In V2X scenarios, the access node 1600 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method for ciphering information in a physical layer of a wireless communications network comprising: obtaining a transport block for transmission using the physical layer, determining whether the size of the transport block satisfies a predetermined threshold, based on a determination that the size of the transport block satisfies a predetermined threshold size: ciphering the entire transport block, and transmitting, to an access node, the ciphered transport block using the physical layer.

Example 2 may include wherein the size of the transport block satisfies the predetermined threshold if the size of the transport block less than the predetermined threshold size.

Example 3 may include wherein the predetermined threshold size is configured by RRC signaling.

Example 4 may include wherein method of Example 1 further comprises based on a determination that the size of the transport block does not satisfy the predetermined threshold: generating ciphering control information that indicates a portion of the obtained transport block that is to be ciphered, ciphering the portion of the obtained transport block indicated by the ciphering control information at a predetermined time, transmitting the ciphering control information to the access node, and transmitting the partially ciphered transport block to the access node using the physical layer.

Example 5 may include wherein the size of the transport block does not satisfy the predetermined threshold if the size of the transport block is greater than the predetermined threshold size.

Example 6 may include wherein the method of Example 1 further comprises: based on a determination that the size of the transport block does not satisfy the predetermined threshold: generating cipher control information that indicates multiple portions of the obtained transport block are to be ciphered, ciphering each of multiple portions of the obtained transport block indicated by the cipher control information at a predetermined time, thereby creating a partially ciphered transport block, transmitting the cipher control information to the access node, and transmitting the partially ciphered transport block to the access node using the physical layer, wherein multiple portions of the transport block are ciphered.

Example 7 may include wherein the method of Example 1 further comprises: based on a determination that the size of the transport block does not satisfy the predetermined threshold: generating cipher control information that indicates a pattern of multiple portions of a transport block that are to be ciphered, ciphering each of the multiple portions of the transport block based on the pattern indicated by the cipher control information at a predetermined time, thereby creating a partially ciphered transport block, transmitting the cipher control information to the access node, and transmitting the partially ciphered transport block to the access node using the physical layer, wherein multiple portions of the transport block are ciphered.

Example 8 may include wherein the method of Example 1 further comprises: based on a determination that the size of the transport block does not satisfy the predetermined threshold: generating cipher control information that indicates a pattern of multiple portions of a transport block that are to be ciphered, ciphering each of the multiple portions of the transport block based on the pattern indicated by the cipher control information at a predetermined time, thereby creating a partially ciphered transport block, transmitting the cipher control information to the access node, and transmitting the partially ciphered transport block to the access node using the physical layer, wherein multiple portions of the transport block are ciphered.

Example 9 may include wherein the physical communications channel can include PRACH, PUSCH, or PUCCH.

Example 10 may include wherein the physical communications channel can include PRACH, PUSCH, or PUCCH Example 11 may include wherein the predetermined time is after TB CRC attachment.

Example 12 may include wherein the predetermined time is after CB segmentation and before CB CRC attachment.

Example 13 may include wherein the predetermined time is after CB segmentation and CB CRC attachment.

Example 14 may include wherein the UE is configured to interpret ciphering control via RRC signaling.

Example 15 may include wherein the RRC signaling configures the UE with ciphering control information including predetermined threshold, particular UCI formats for ciphering control information, or particular frequency ranges.

Example 16 may include wherein the ciphering control information is included in the header of the partially ciphered transport block and transmitted along with the partially ciphered transport block using the physical layer.

Example 17 may include wherein the method of Example 1 further comprises: based on a determination that the size of the transport block does not satisfy the predetermined threshold: determining a pattern of transport blocks to be transmitted, generating ciphering control information that indicates a portion of the each transport blocks in the pattern of transport blocks that is to be ciphered, ciphering transport blocks in the pattern of transport blocks as indicated by the ciphering control information at a predetermined time, transmitting, the ciphering control information to the access node, and transmitting the partially ciphered transport block to the access node using the physical layer.

Example 18 may include wherein the method of Example 1 further comprises: based on a determination that the size of the transport block does not satisfy the predetermined threshold: scheduling logical channels in manner that creates a particular pattern within the transport block to be transmitted, generating ciphering control information that indicates a portion the transport block that is to be ciphered at a predetermined time, ciphering transport block in the pattern of transport blocks as indicated by the ciphering control information, transmitting the ciphering control information to the access node, and transmitting the partially ciphered transport block to the access node using the physical layer.

Example 19 may include one or more non-transitory computer-readable media including instructions to cause an electronic device, upon execution of the instructions by one or more processors of the electronic device, to perform one or more elements of a method described in or related to any of examples 1-18, or any other method or process described herein.

Example 20 may include an apparatus including logic, modules, or circuitry to perform one or more elements of a method described in or related to any of examples 1-18, or any other method or process described herein.

Example 21 may include a method, technique, or process as described in or related to any of examples 1-18, or portions or parts thereof.

Example 22 may include an apparatus including: one or more processors and one or more computer-readable media including instructions that, when executed by the one or more processors, cause the one or more processors to perform the method, techniques, or process as described in or related to any of examples 1-18, or portions thereof.

Example 23 may include a signal as described in or related to any of examples 1-18, or portions or parts thereof.

Example 24 may include a datagram, information element, packet, frame, segment, PDU, or message as described in or related to any of examples 1-18, or portions or parts thereof, or otherwise described in the present disclosure.

Example 25 may include a signal encoded with data as described in or related to any of examples 1-18, or portions or parts thereof, or otherwise described in the present disclosure.

Example 26 may include a signal encoded with a datagram, IE, packet, frame, segment, PDU, or message as described in or related to any of examples 1-18, or portions or parts thereof, or otherwise described in the present disclosure.

Example 27 may include an electromagnetic signal carrying computer-readable instructions, wherein execution of the computer-readable instructions by one or more processors is to cause the one or more processors to perform the method, techniques, or process as described in or related to any of examples 1-18, or portions thereof.

Example 28 may include a computer program including instructions, wherein execution of the program by a processing element is to cause the processing element to carry out the method, techniques, or process as described in or related to any of examples 1-18, or portions thereof. The operations or actions performed by the instructions executed by the processing element can include the methods of any one of examples 1-18.

Example 29 may include a signal in a wireless network as shown and described herein.

Example 30 may include a method of communicating in a wireless network as shown and described herein.

Example 31 may include a system for providing wireless communication as shown and described herein. The operations or actions performed by the system can include the methods of any one of examples 1-18.

Example 32 may include a device for providing wireless communication as shown and described herein. The operations or actions performed by the device can include the methods of any one of examples 1-18.

The previously-described examples 1-32 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

A system, e.g., a base station, an apparatus including one or more baseband processors, and so forth, can be configured to perform particular operations or actions by virtue of having software, firmware, hardware, or a combination of them installed on the system that in operation causes or cause the system to perform the actions. The operations or actions performed either by the system can include the methods of any one of examples 1-18.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users

We claim:

1. An apparatus comprising one or more baseband processors configured to perform operations for ciphering information in a physical layer of a wireless communications network, the operations comprising:
    obtaining a transport block for transmission using the physical layer;
    determining whether a size of the transport block satisfies a predetermined threshold; and
    based on a determination that the size of the transport block satisfies a predetermined threshold size:
        ciphering the transport block, and
        transmitting the ciphered transport block using the physical layer.

2. The apparatus of claim 1, where the size of the transport block satisfies the predetermined threshold if the size of the transport block less than the predetermined threshold size.

3. The apparatus of claim 1, wherein the predetermined threshold size is configured by RRC signaling.

4. The apparatus of claim 1, the operations further comprising:
    based on a determination that the size of the transport block does not satisfy the predetermined threshold:
        generating ciphering control information that indicates a portion of the obtained transport block that is to be ciphered;
        ciphering the portion of the obtained transport block indicated by the ciphering control information at a predetermined time;
        transmitting the ciphering control information to an access node; and
        transmitting the partially ciphered transport block to an access node using the physical layer.

5. The apparatus of claim 4, wherein the size of the transport block does not satisfy the predetermined threshold if the size of the transport block is greater than the predetermined threshold size.

6. The apparatus of claim 1, the operations further comprising:
    based on a determination that the size of the transport block does not satisfy the predetermined threshold:
        generating cipher control information that indicates multiple portions of the obtained transport block are to be ciphered;
        ciphering each of multiple portions of the obtained transport block indicated by the cipher control information at a predetermined time, thereby creating a partially ciphered transport block;
        transmitting the cipher control information to an access node; and
        transmitting the partially ciphered transport block to an access node using the physical layer, wherein multiple portions of the transport block are ciphered.

7. The apparatus of claim 1, the operations further comprising:
    based on a determination that the size of the transport block does not satisfy the predetermined threshold:
        generating cipher control information that indicates a pattern of multiple portions of a transport block that are to be ciphered;
        ciphering each of the multiple portions of the transport block based on the pattern indicated by the cipher control information at a predetermined time, thereby creating a partially ciphered transport block;
        transmitting the cipher control information to an access node; and
        transmitting the partially ciphered transport block to an access node using the physical layer, wherein multiple portions of the transport block are ciphered.

8. The apparatus of claim 1, wherein the physical layer includes a PRACH, PUSCH, or PUCCH.

9. The apparatus of claim 7, wherein the predetermined time is after TB CRC attachment.

10. The apparatus of claim 7, wherein the predetermined time is after CB segmentation and before CB CRC attachment.

11. The apparatus of claim 7, wherein the predetermined time is after CB segmentation and CB CRC attachment.

12. The apparatus of claim 1, wherein the apparatus is configured to interpret ciphering control via RRC signaling.

13. The apparatus of claim 12, wherein the RRC signaling configures the apparatus with ciphering control information including predetermined threshold, particular UCI formats for ciphering control information, or particular frequency ranges.

14. The apparatus of claim 7, wherein the ciphering control information is included in a header of the partially ciphered transport block and transmitted along with the partially ciphered transport block using the physical layer.

15. The apparatus of claim 1, the operations further comprising:
    based on a determination that the size of the transport block does not satisfy the predetermined threshold:
        determining a pattern of transport blocks to be transmitted;
        generating ciphering control information that indicates a portion of each transport block in the pattern of transport blocks that is to be ciphered;
        ciphering transport blocks in the pattern of transport blocks as indicated by the ciphering control information at a predetermined time;
        transmitting the ciphering control information to an access node; and
        transmitting the partially ciphered transport block to an access node using the physical layer.

16. The apparatus of claim 1, the operations further comprising:
    based on a determination that the size of the transport block does not satisfy the predetermined threshold:
        scheduling logical channels in manner that creates a particular pattern within the transport block to be transmitted;
        generating ciphering control information that indicates a portion of the transport block that is to be ciphered at a predetermined time;
        ciphering the portion of the transport block in the pattern of transport blocks as indicated by the ciphering control information;
        transmitting the ciphering control information to an access node; and
        transmitting the partially ciphered transport block to an access node using the physical layer.

17. The apparatus of claim 1, wherein the apparatus is a UE.

* * * * *

UNITED STATES PATENT AND TRADEMARK OFFICE
CERTIFICATE OF CORRECTION

| | |
|---|---|
| PATENT NO. | : 12,413,962 B2 |
| APPLICATION NO. | : 18/239891 |
| DATED | : September 9, 2025 |
| INVENTOR(S) | : Christian Hofmann et al. |

It is certified that error appears in the above-identified patent and that said Letters Patent is hereby corrected as shown below:

In the Claims

Column 25, Line 15, In Claim 2, delete "where" and insert -- wherein --.

Signed and Sealed this
Twenty-fifth Day of November, 2025

John A. Squires
*Director of the United States Patent and Trademark Office*